Feb. 23, 1937. J. R. TOMLIN ET AL 2,071,440
WEB SUPPLY MECHANISM
Filed March 3, 1932 24 Sheets-Sheet 4
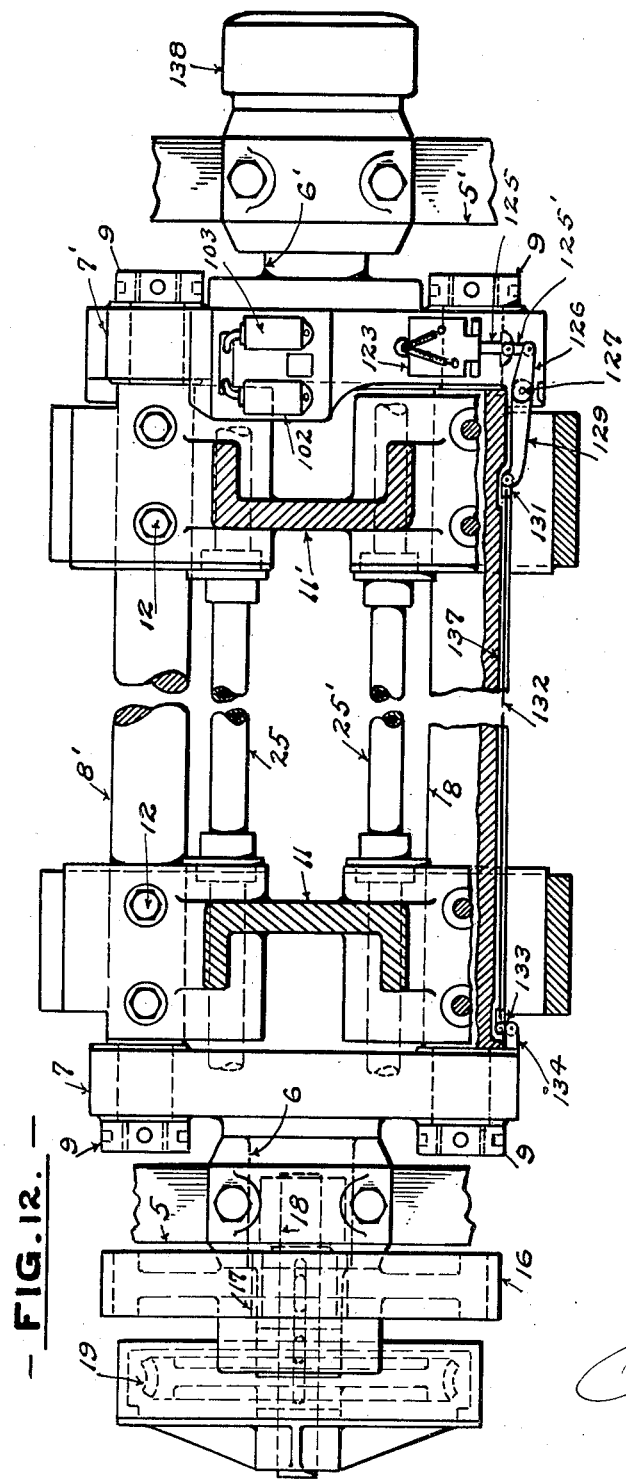
INVENTORS

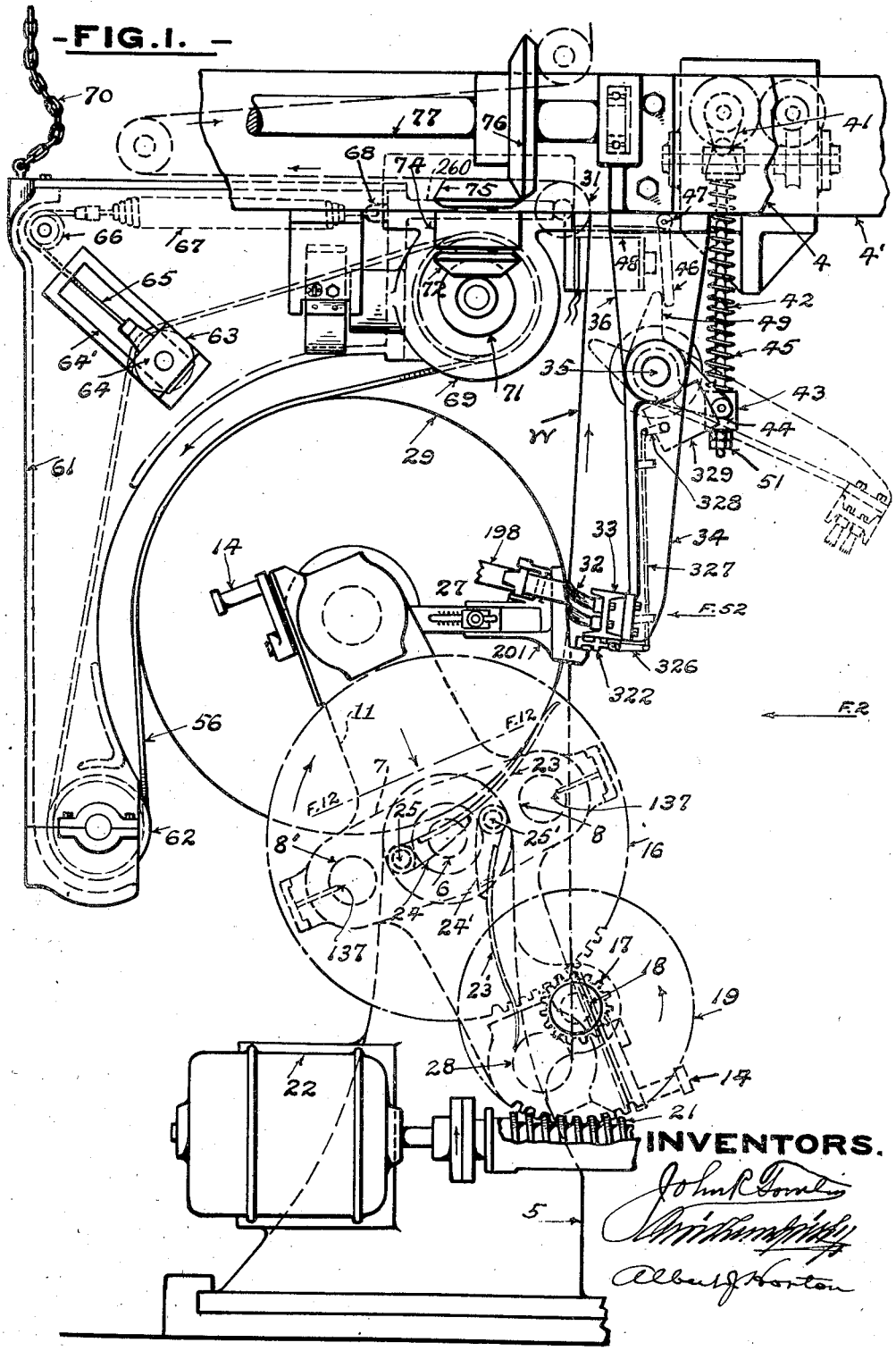

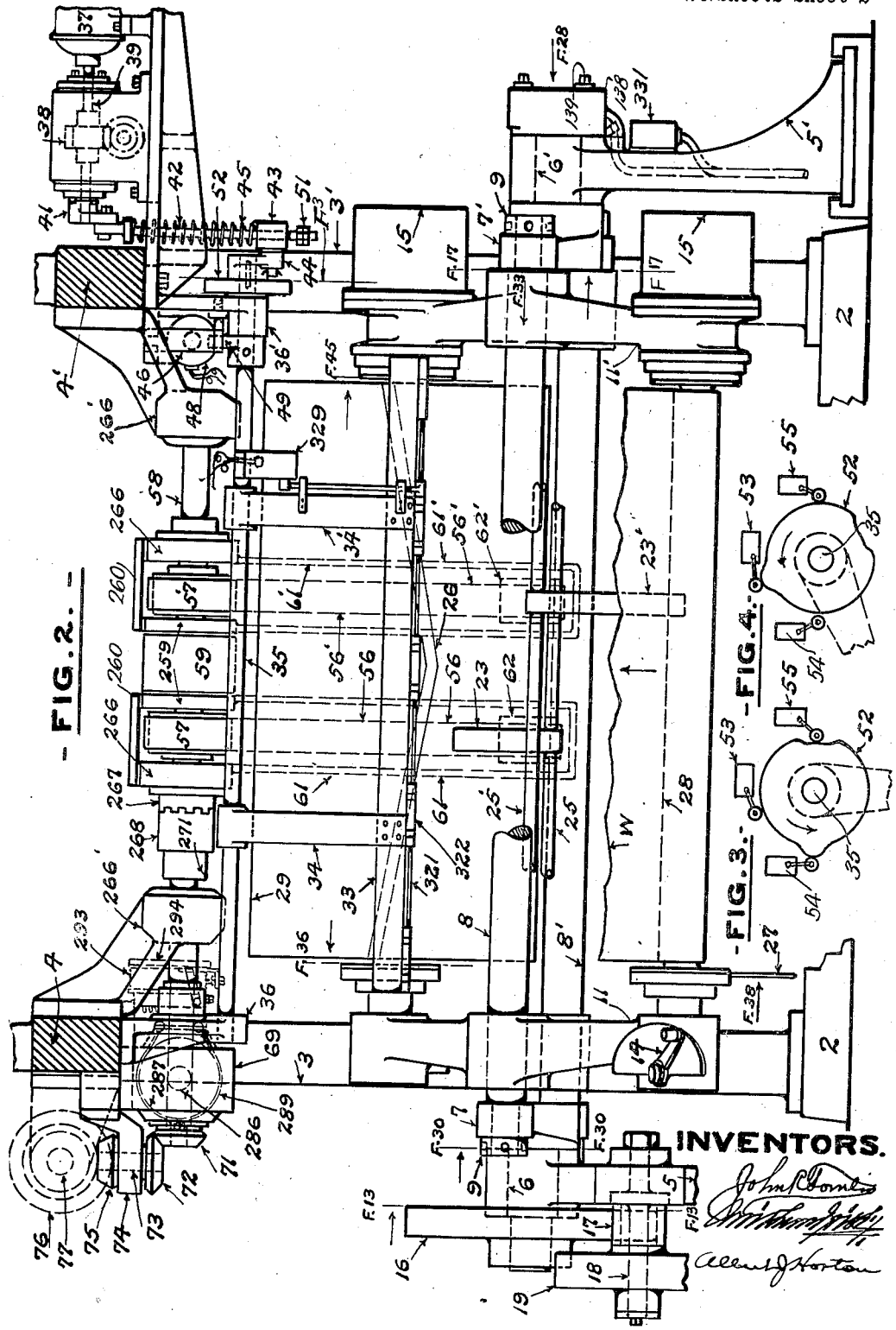

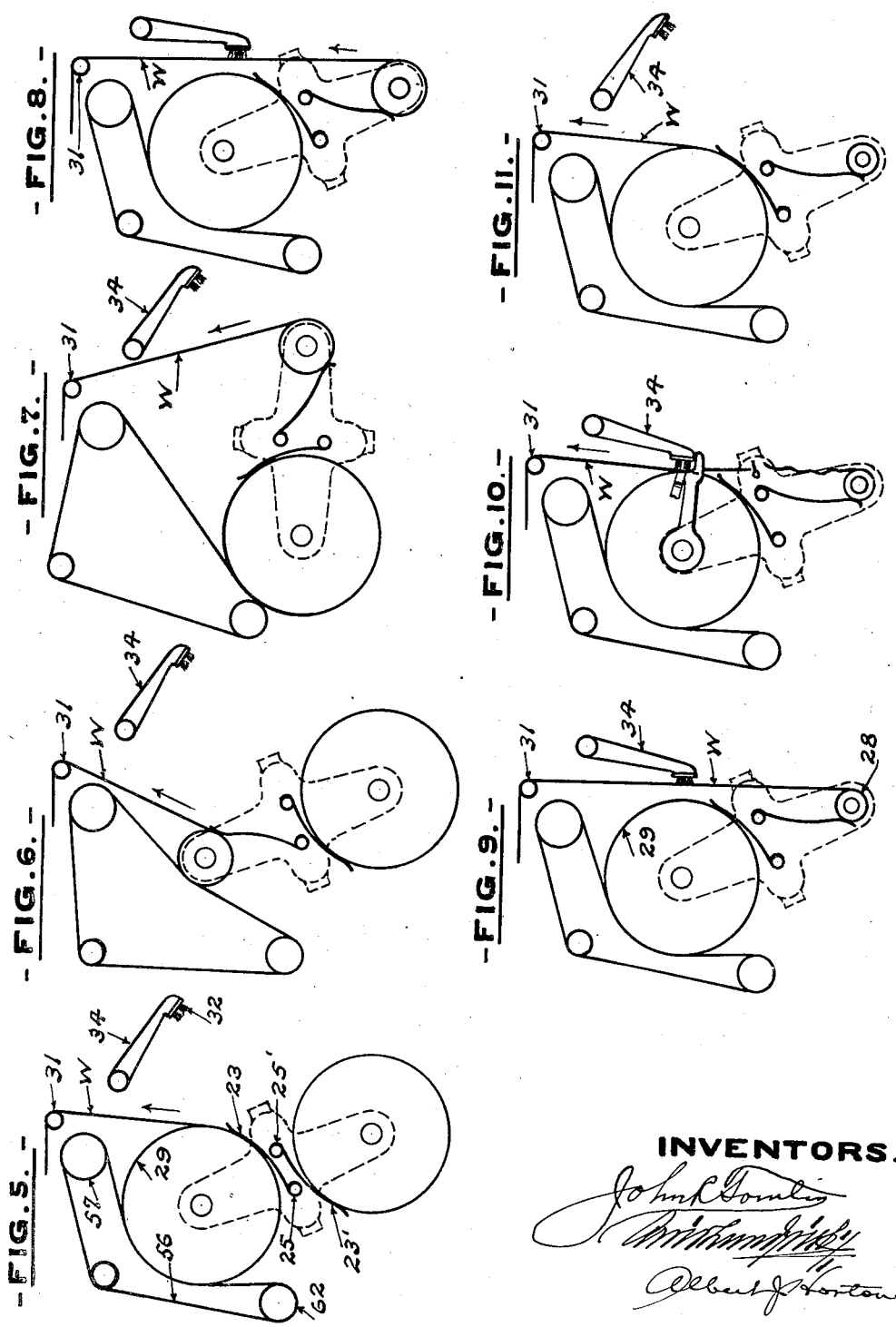

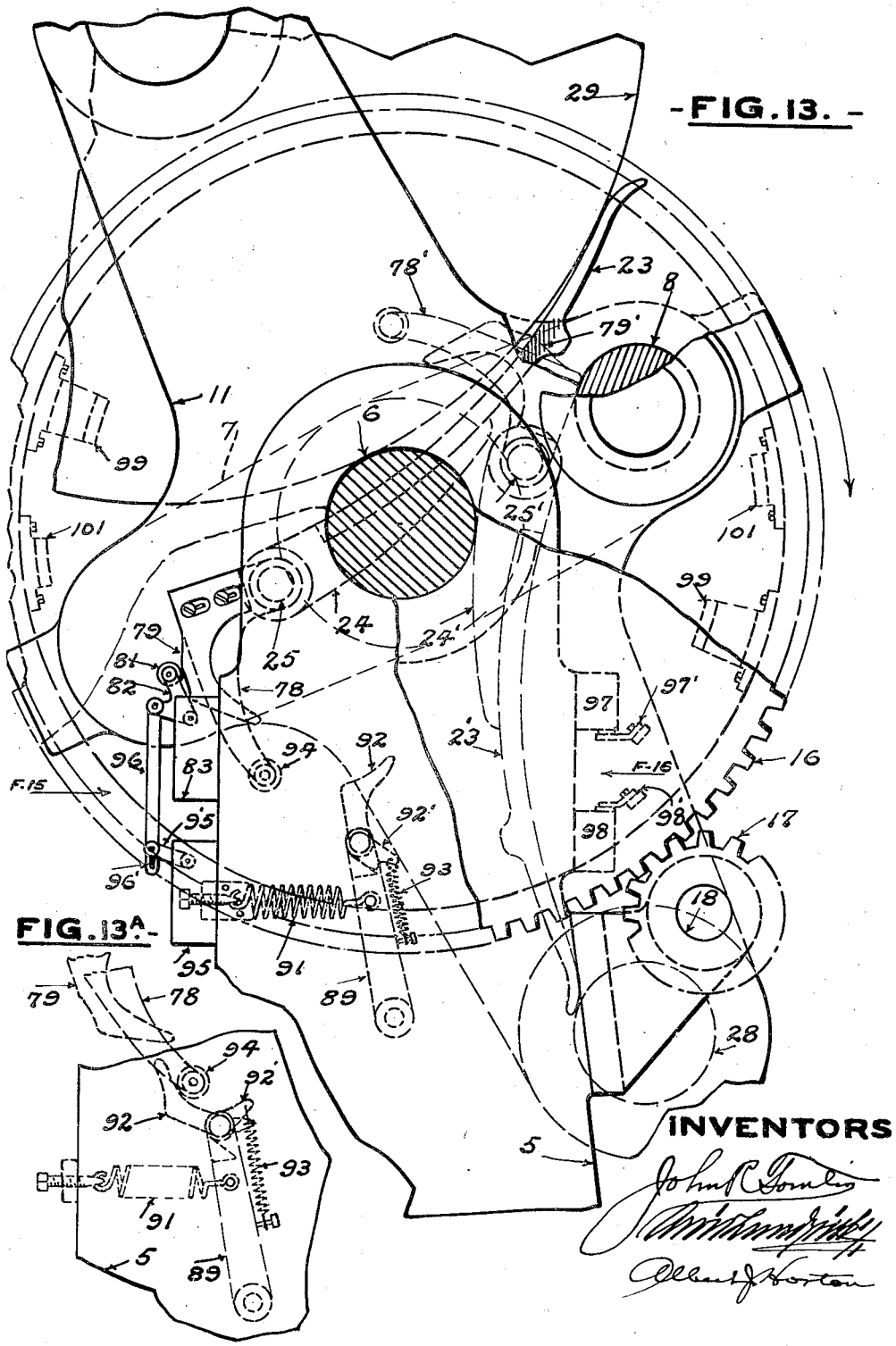

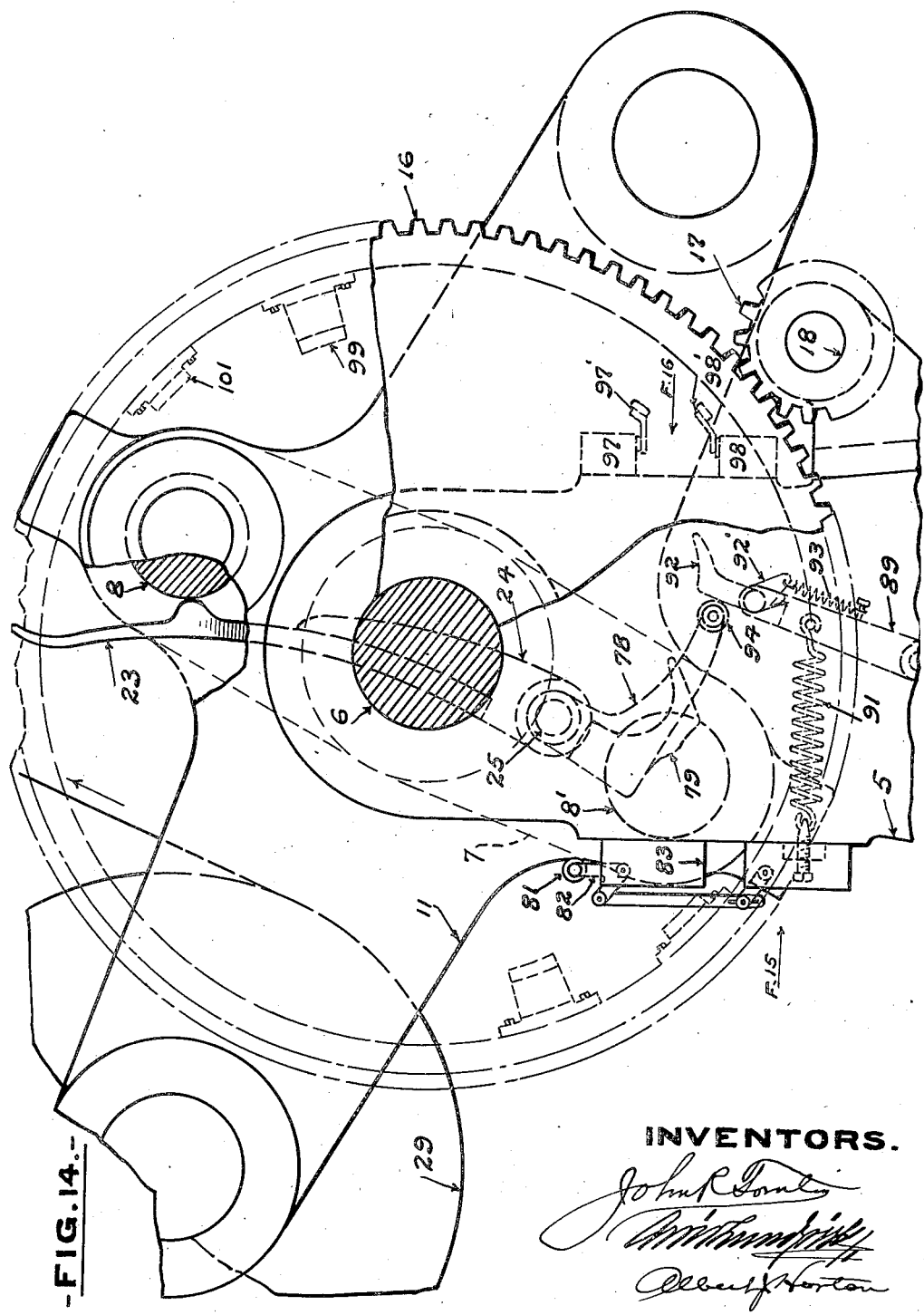

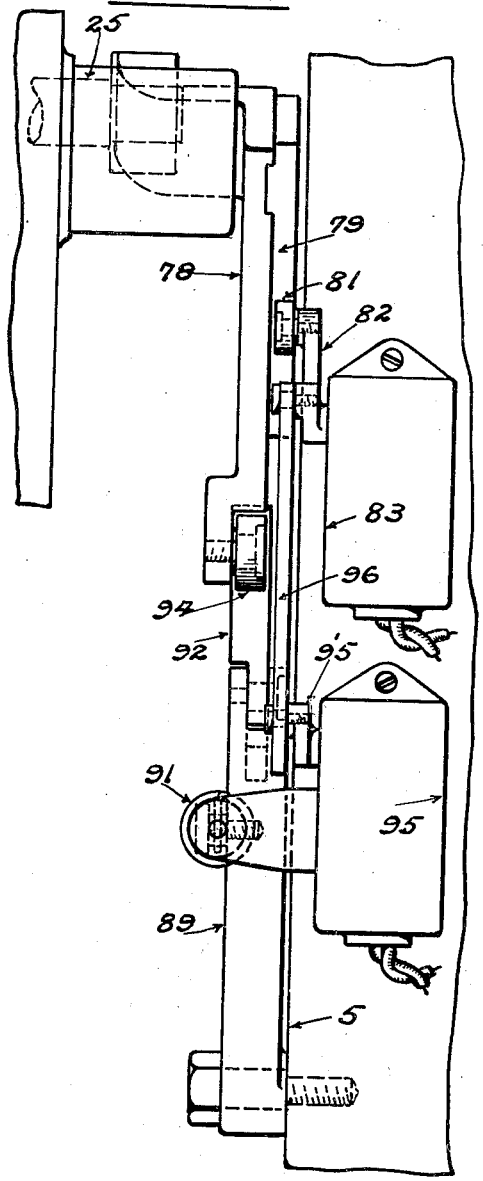

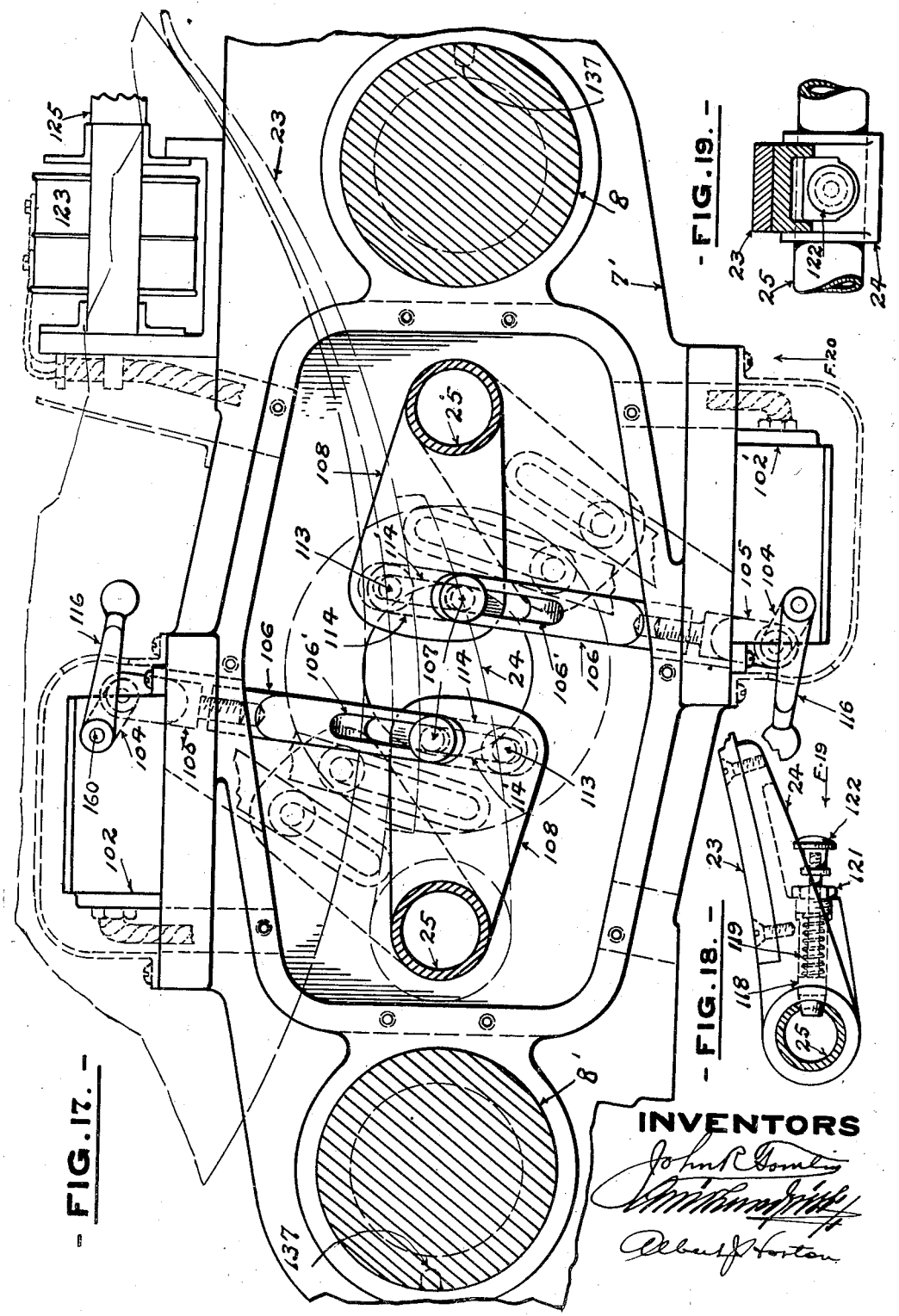

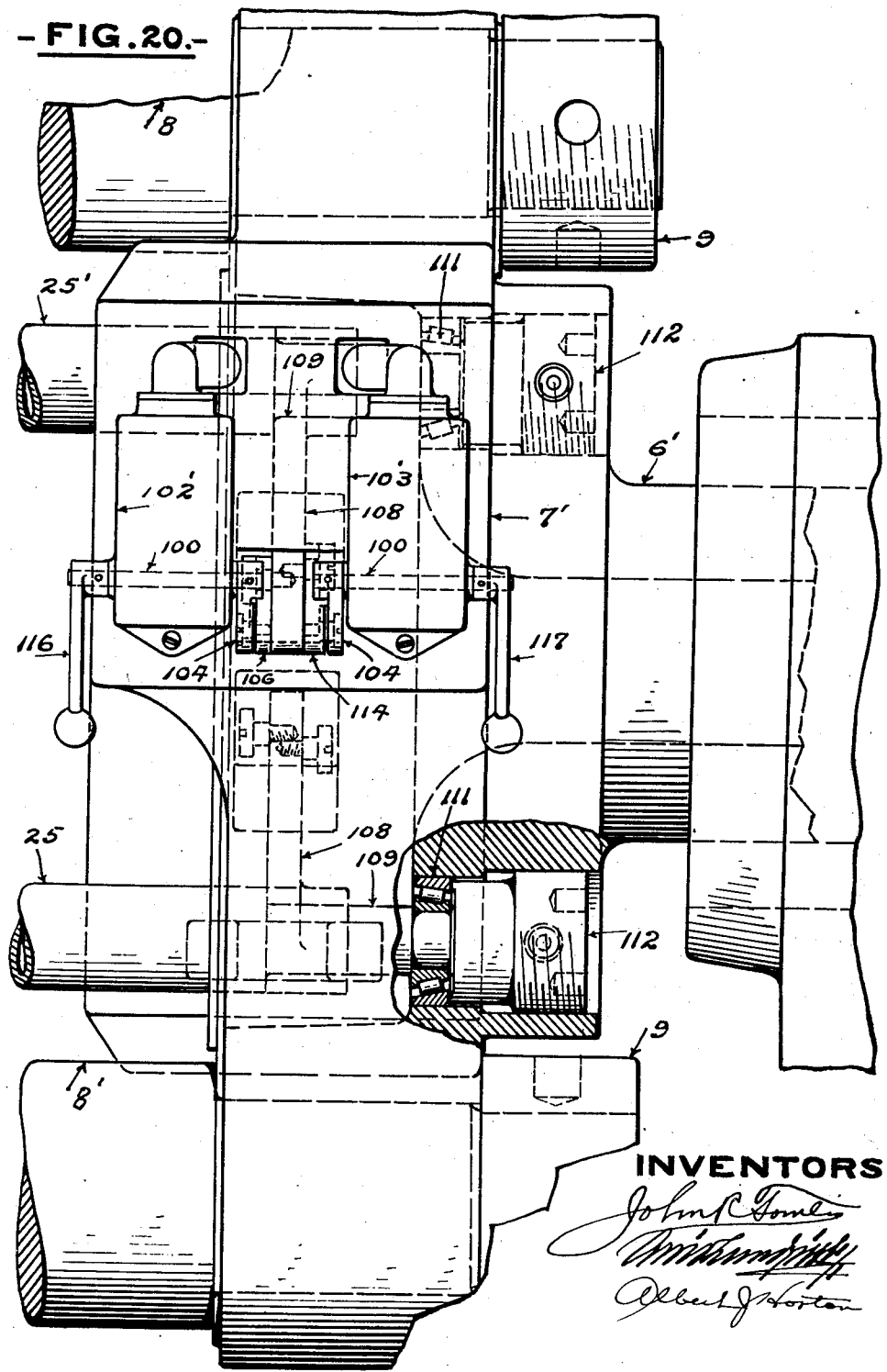

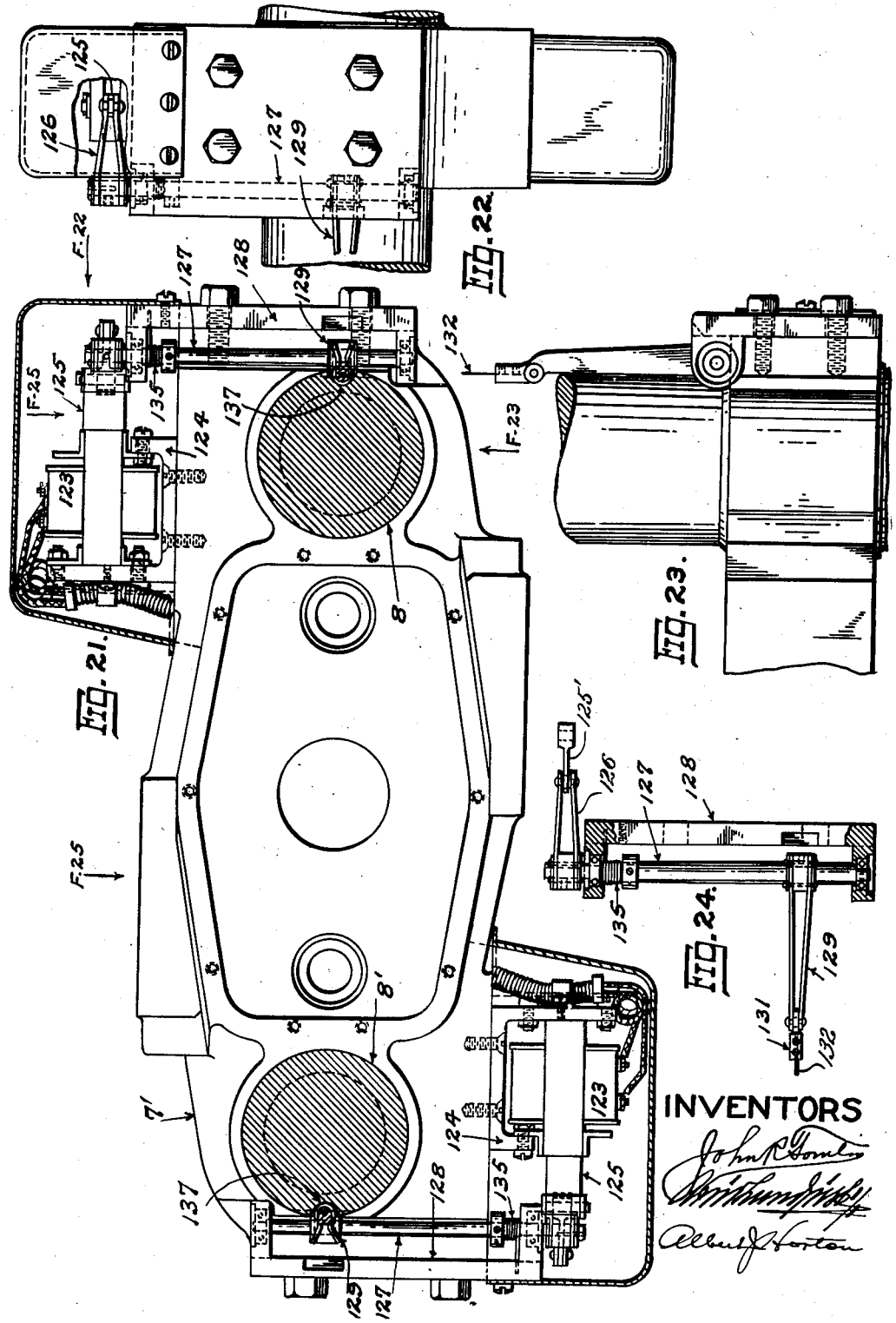

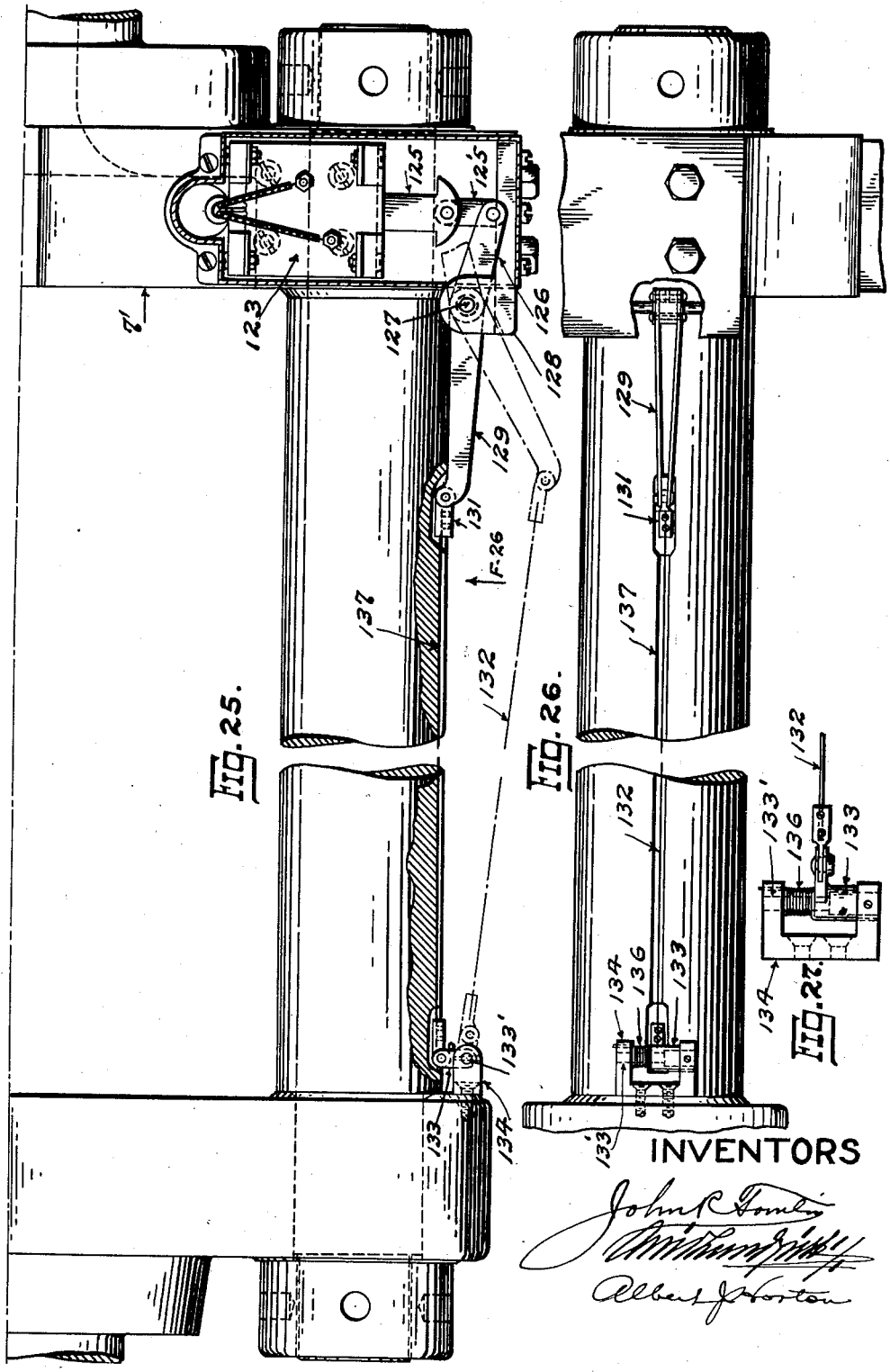

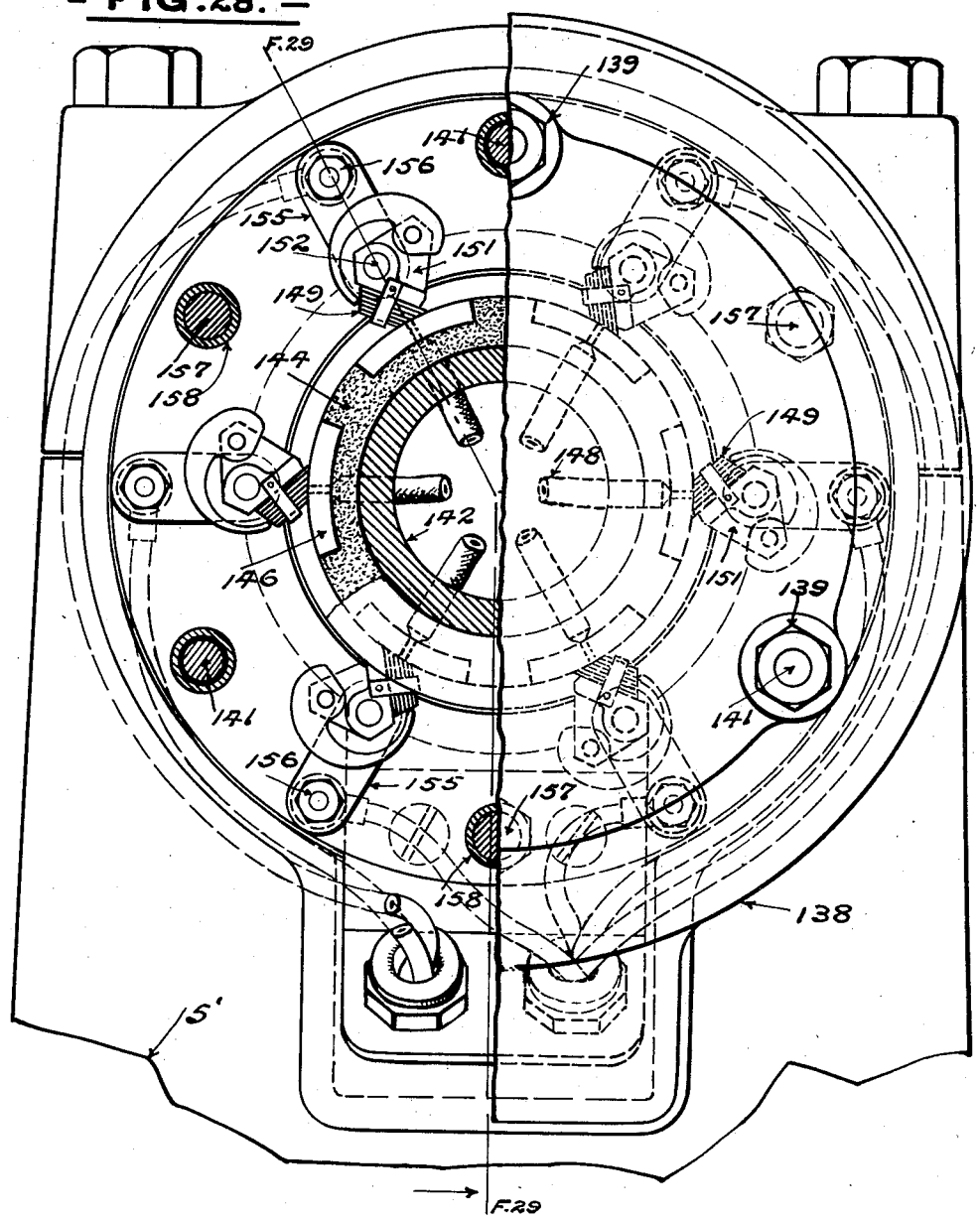

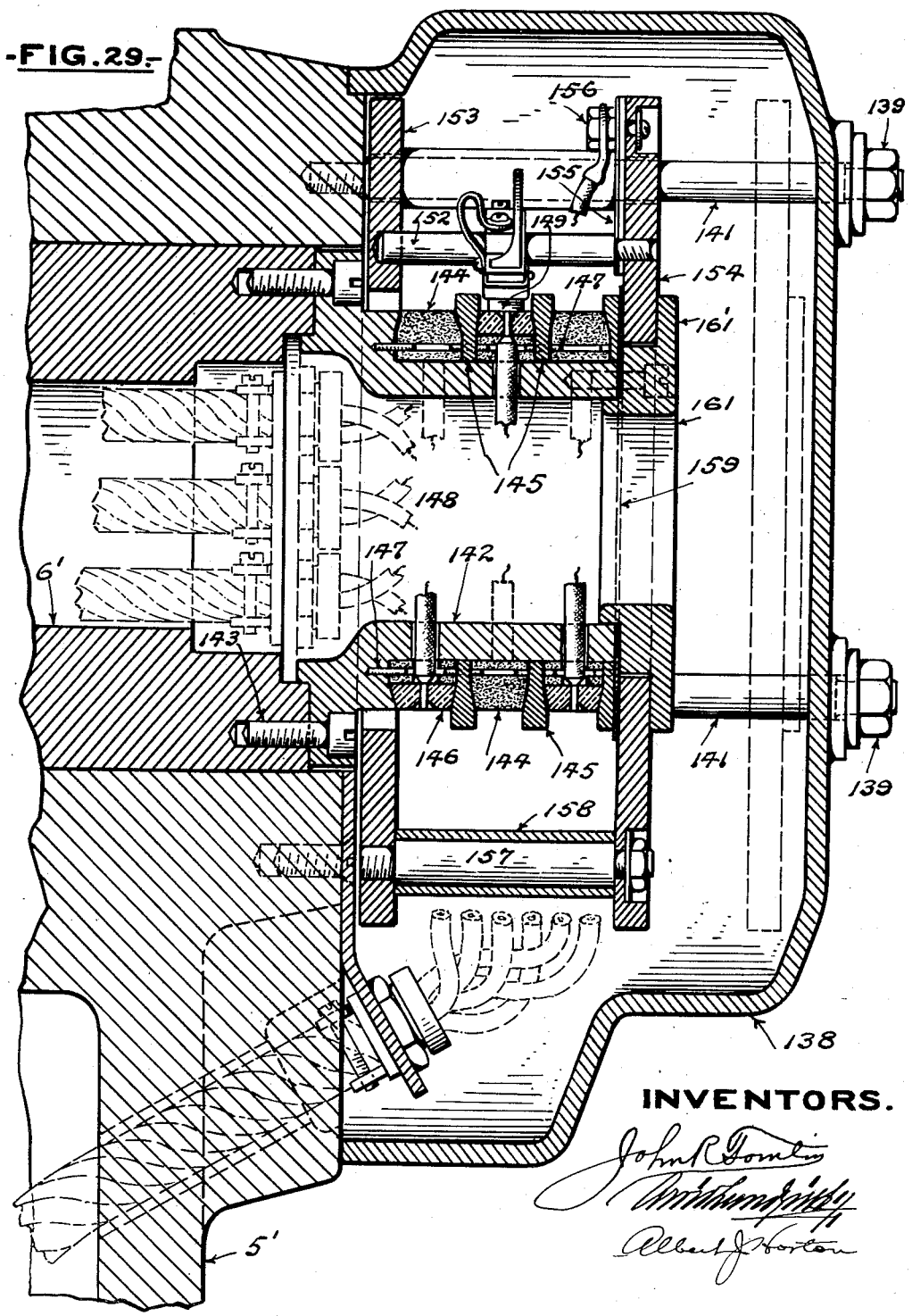

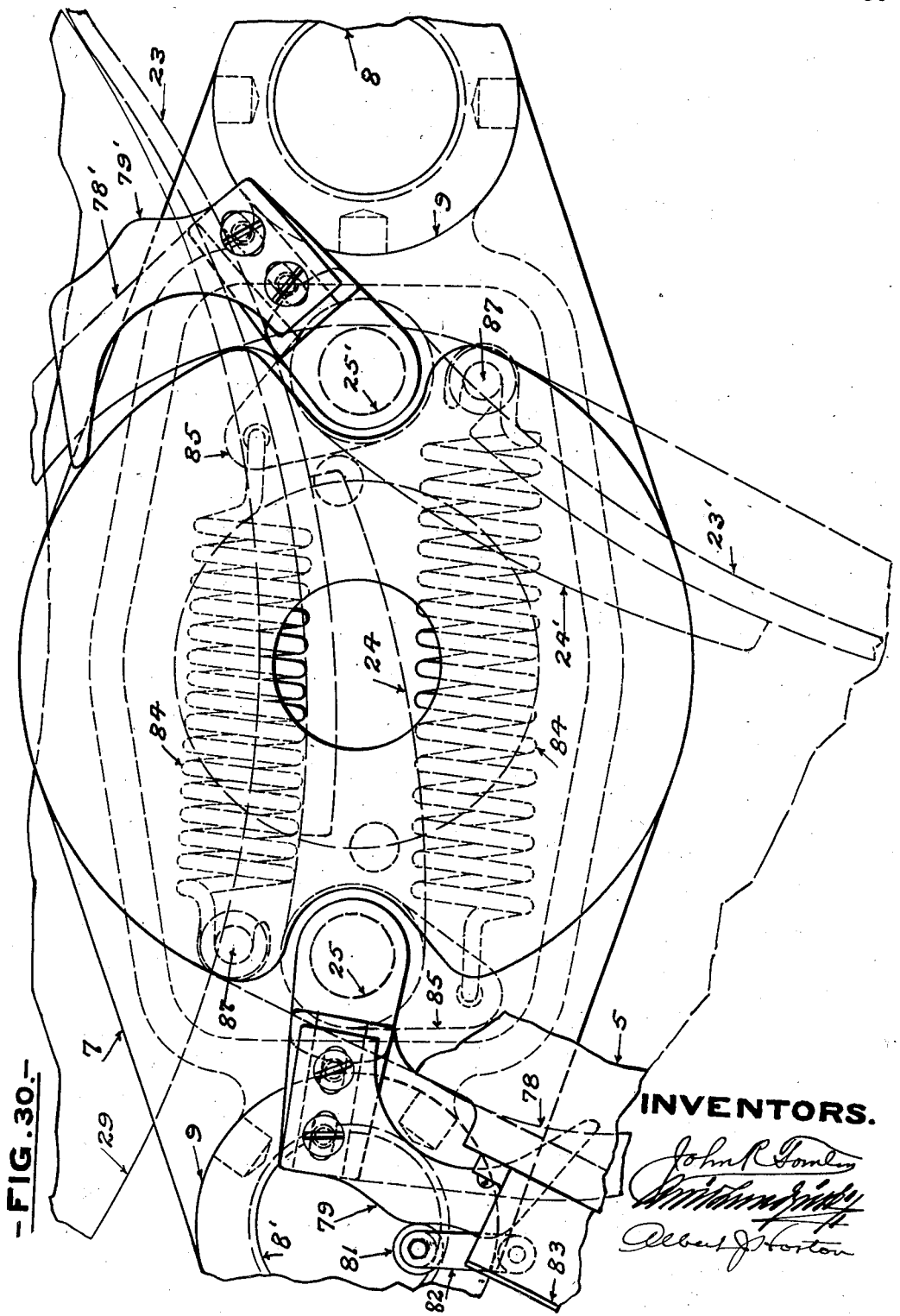

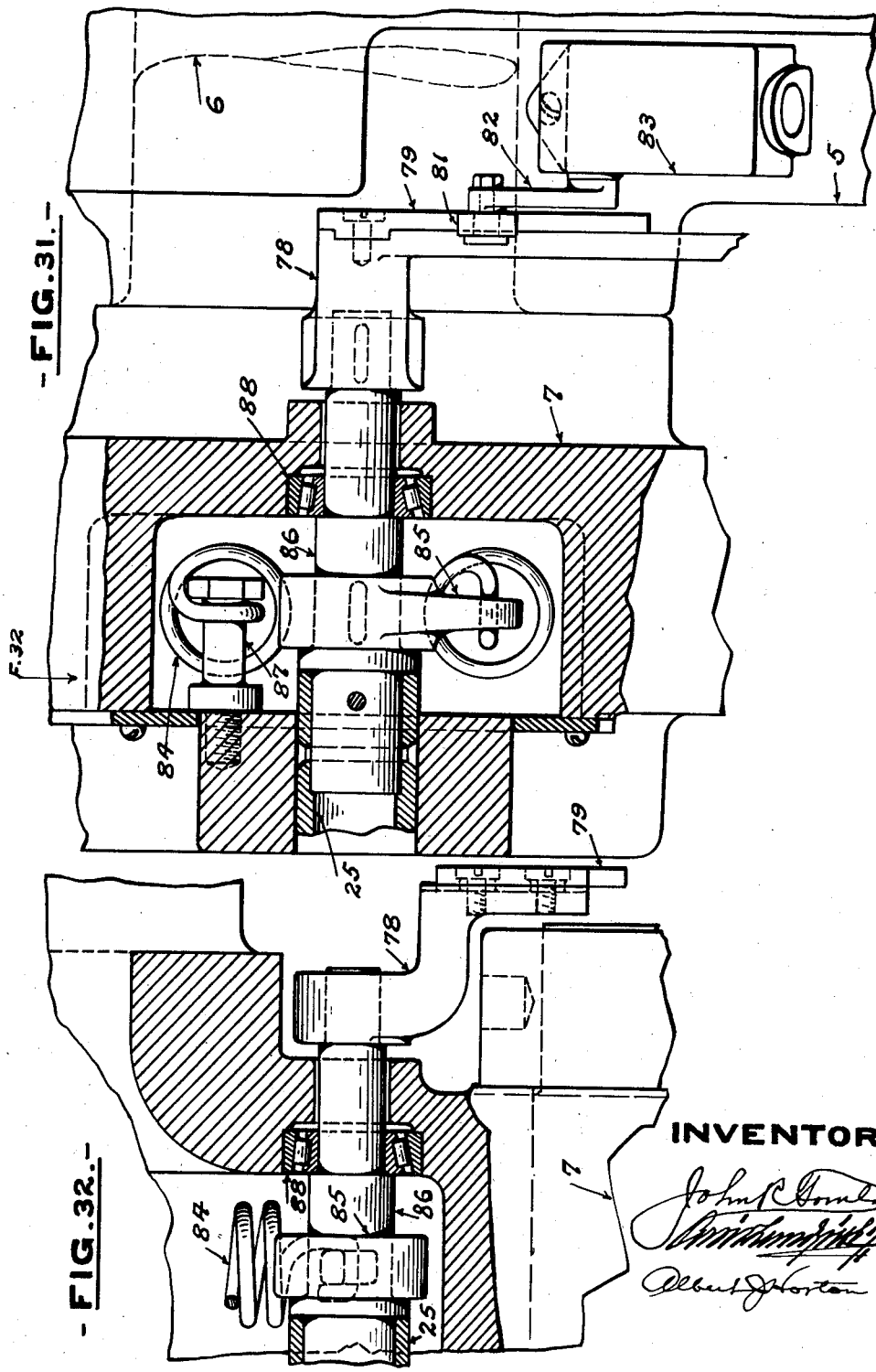

Feb. 23, 1937.  J. R. TOMLIN ET AL  2,071,440
WEB SUPPLY MECHANISM
Filed March 3, 1932   24 Sheets-Sheet 16
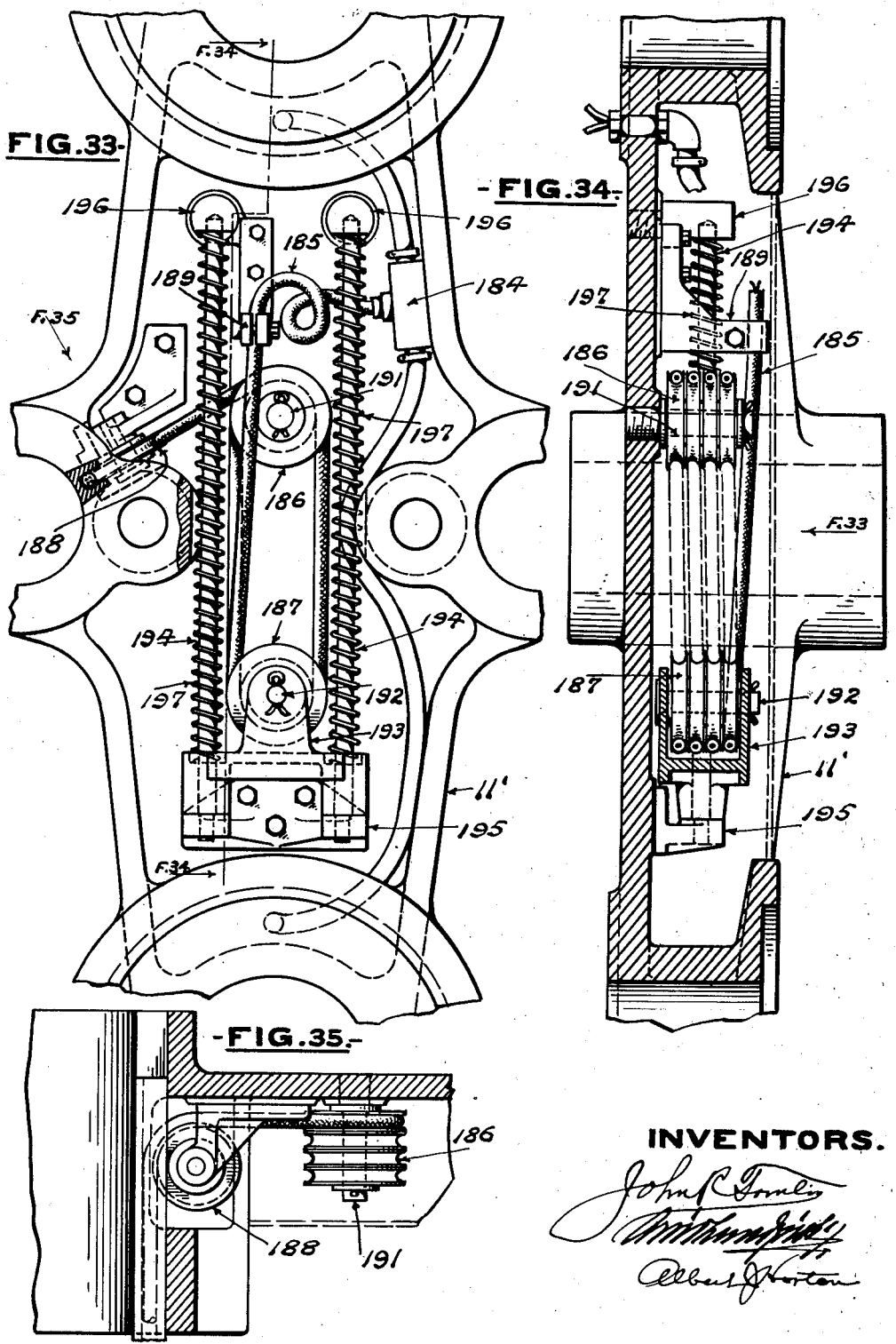
INVENTORS.

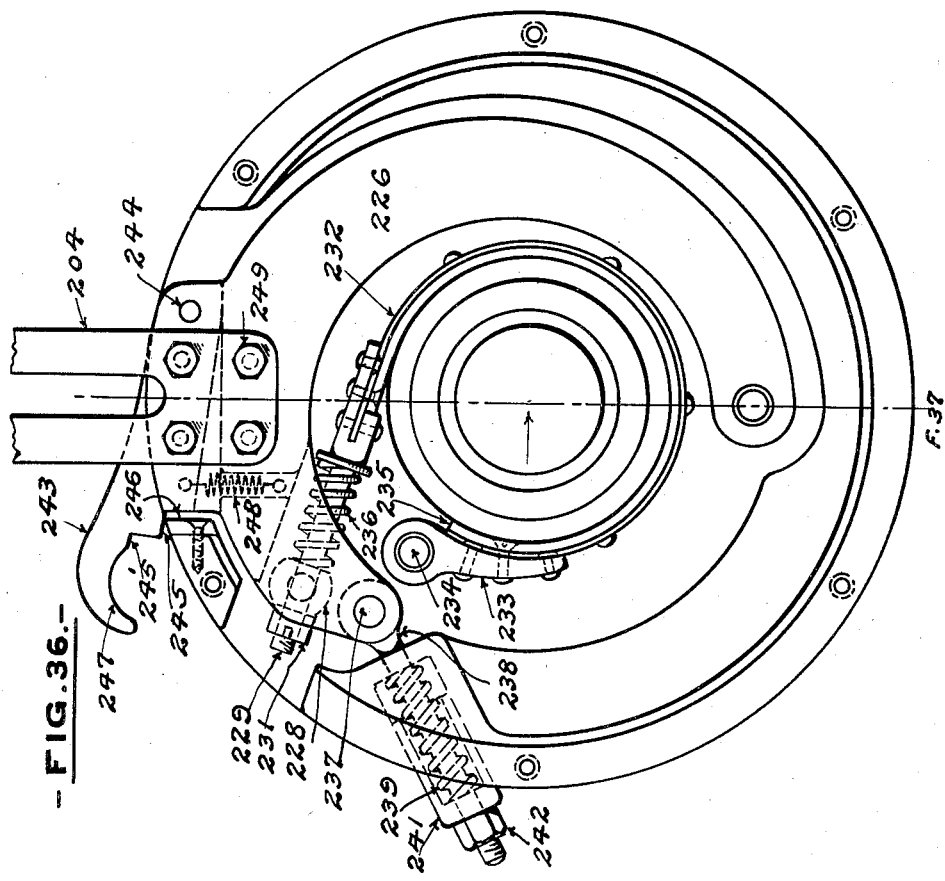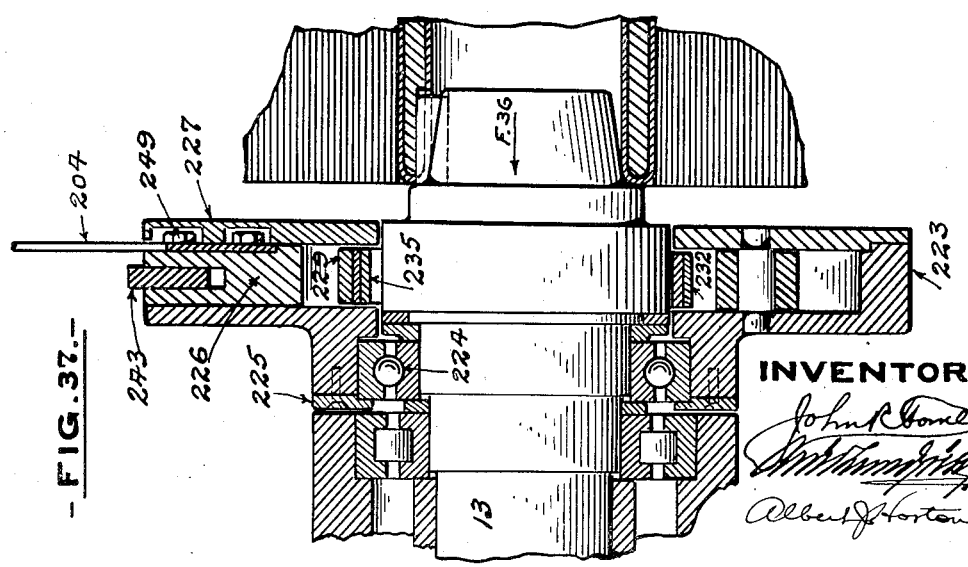

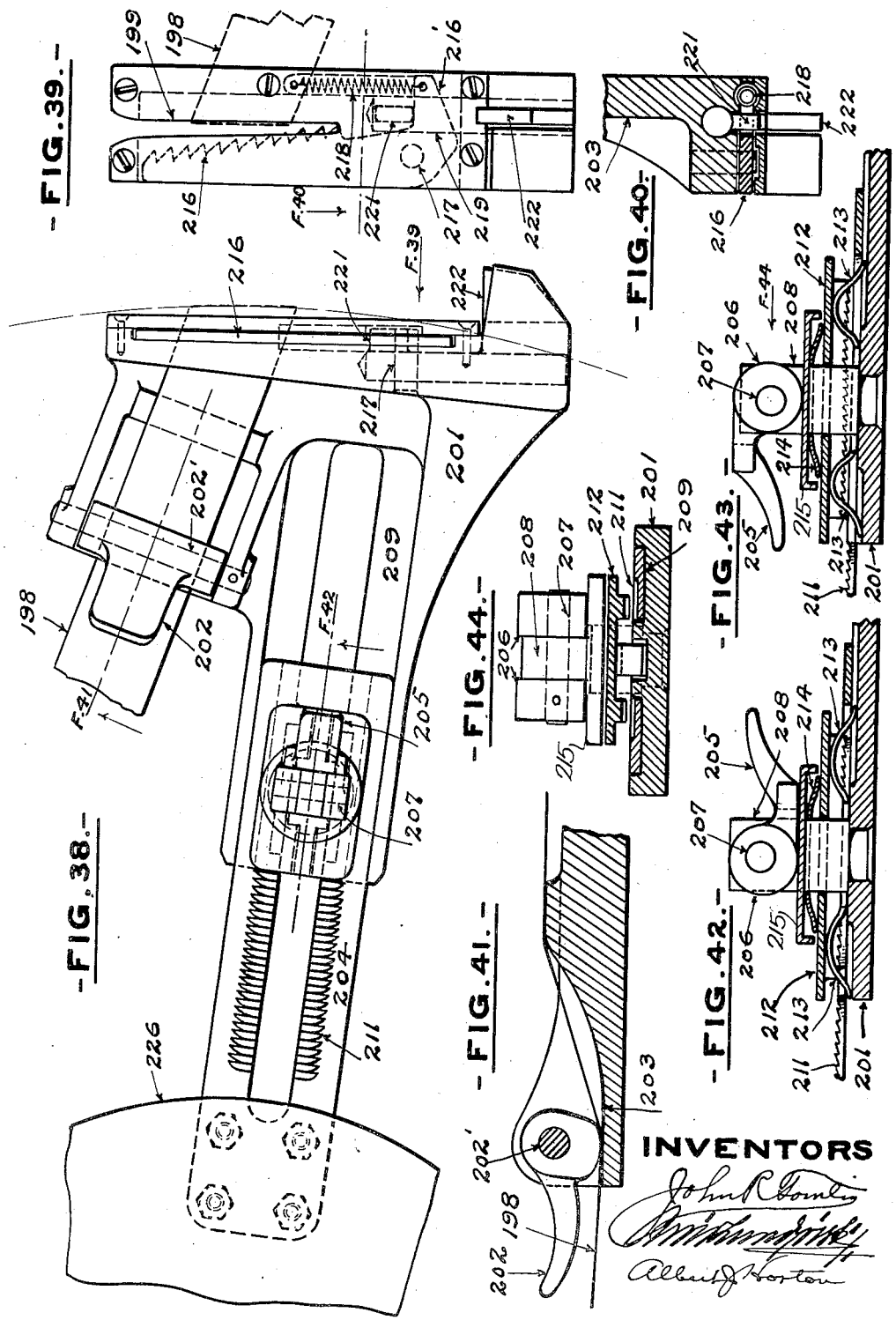

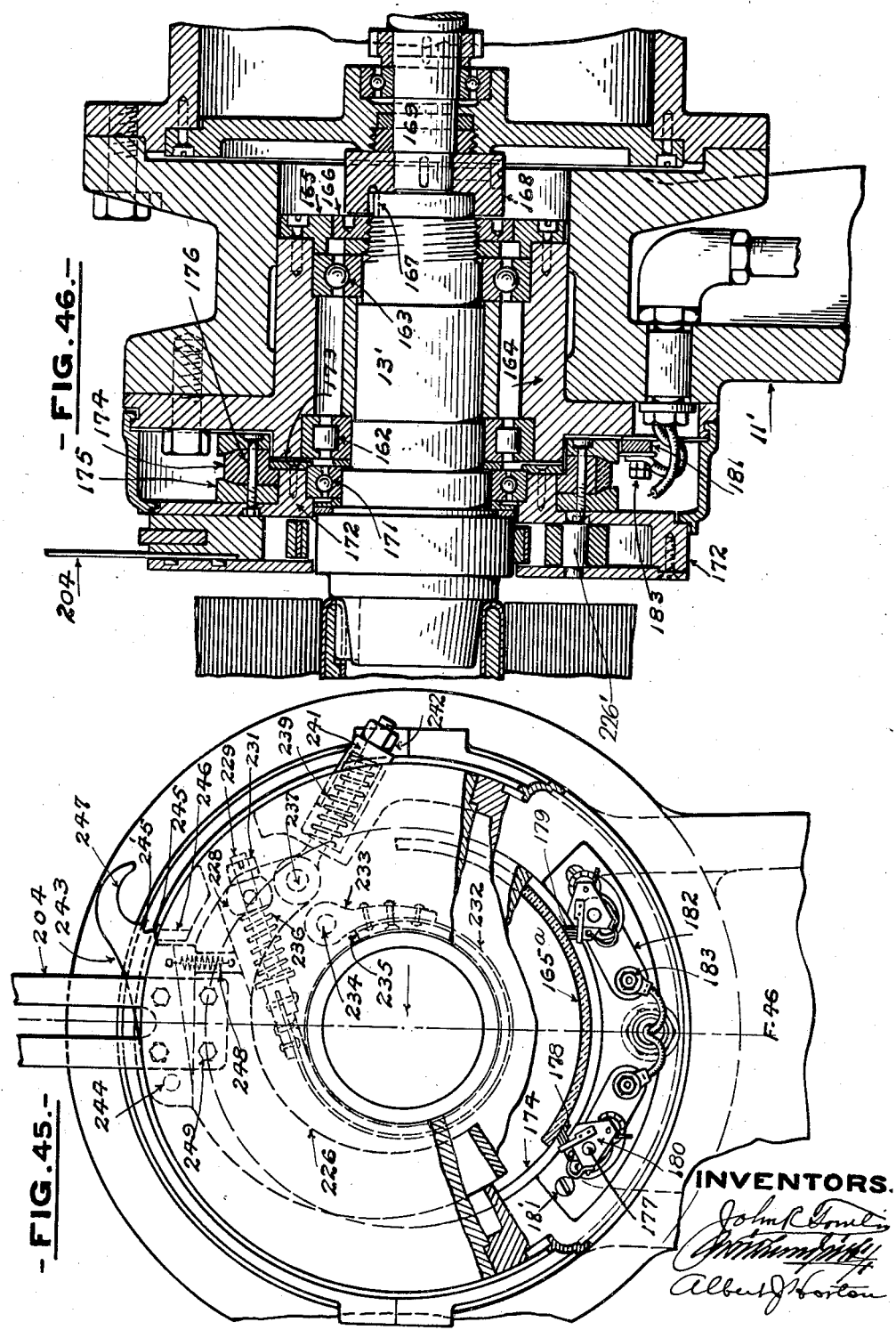

Feb. 23, 1937. J. R. TOMLIN ET AL 2,071,440
WEB SUPPLY MECHANISM
Filed March 3, 1932 24 Sheets-Sheet 20
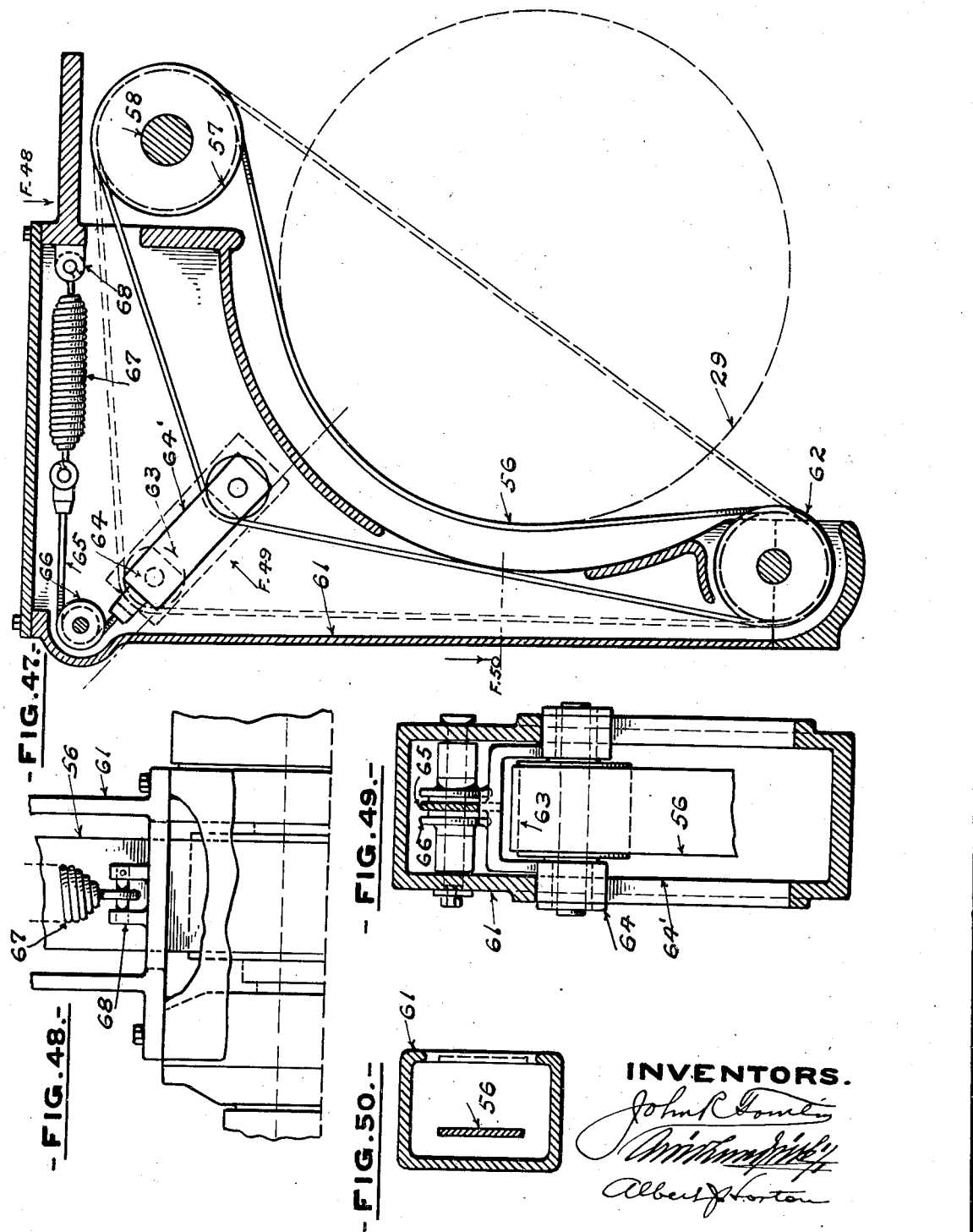

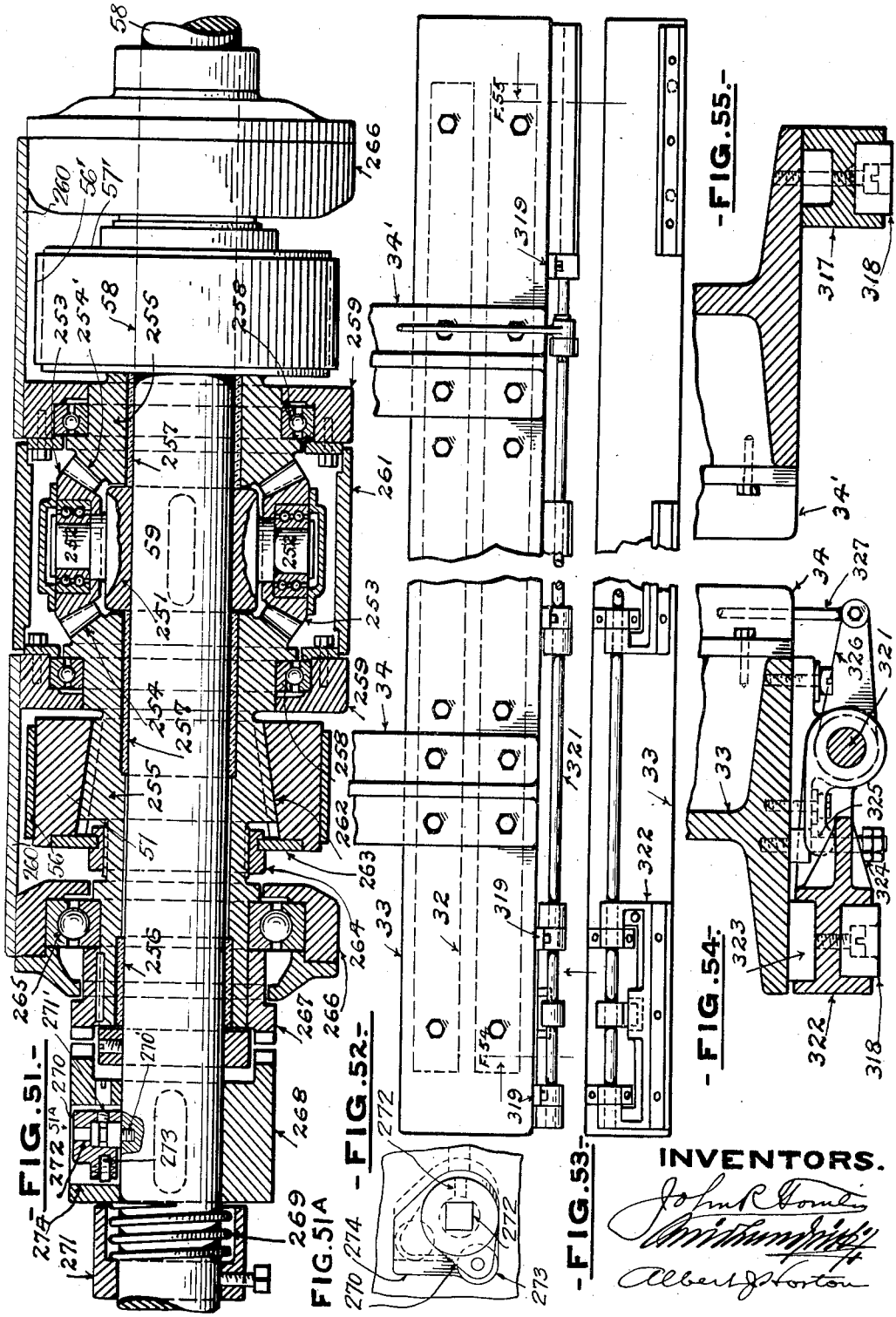

Feb. 23, 1937. J. R. TOMLIN ET AL 2,071,440
WEB SUPPLY MECHANISM
Filed March 3, 1932 24 Sheets-Sheet 22
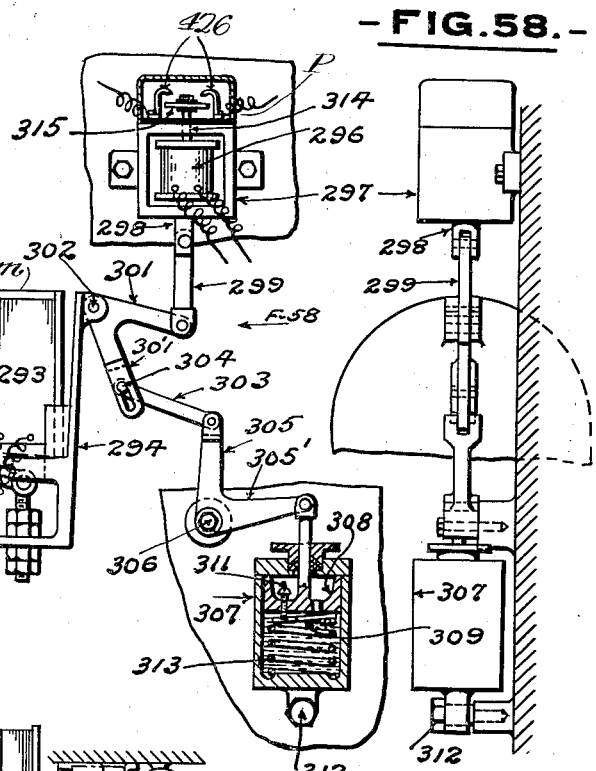
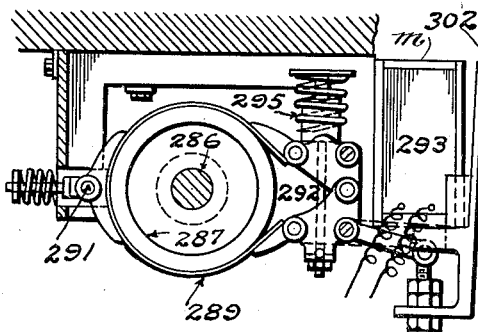
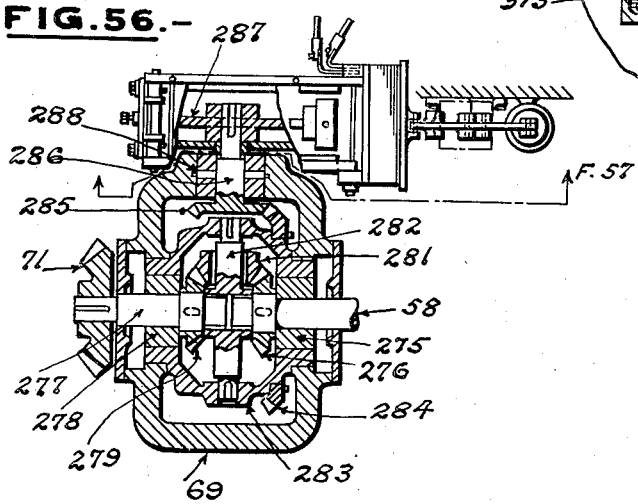
INVENTORS

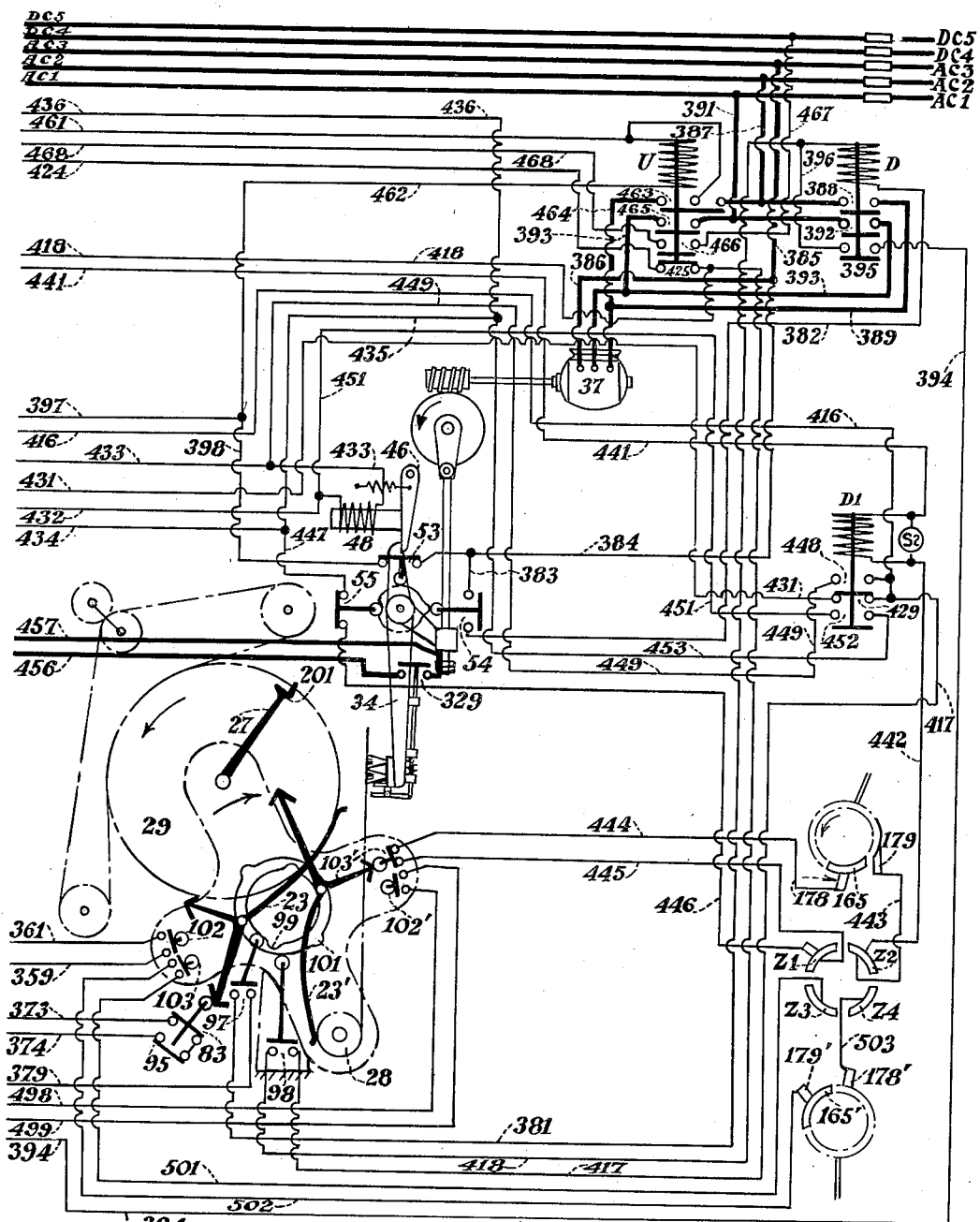
-FIG.59.-

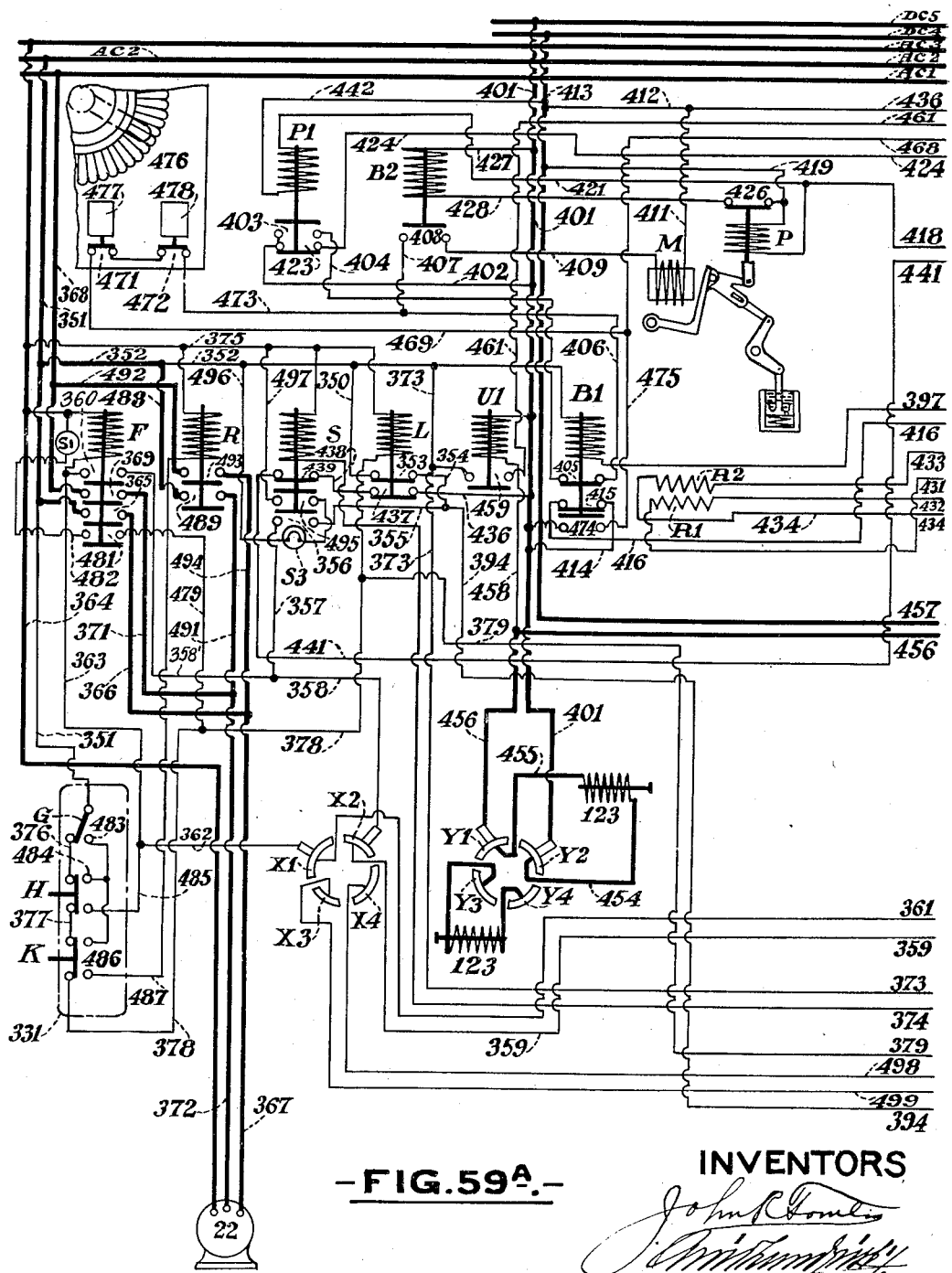

Patented Feb. 23, 1937

2,071,440

UNITED STATES PATENT OFFICE 2,071,440

WEB SUPPLY MECHANISM

John R. Tomlin and Arvid Lundquist, New York, and Albert J. Horton, White Plains, N. Y., assignors to R. Hoe & Co., Inc., New York, N. Y., a corporation of New York; Irving Trust Company, permanent trustee Application March 3, 1932, Serial No. 596,508

95 Claims. (Cl. 242—58)

This invention relates to web supply mechanism for machines such as printing machines that operate on webs fed from web rolls, and has particular application to high speed rotary printing machines that are used for printing newspapers and similar products.

When a high speed printing machine is operated at full speed a full web roll becomes exhausted and must be replaced in about 15 minutes. In many of these machines four or more rolls are used simultaneously, and as these usually expire at different times, it will be understood that if the machine is stopped to replace the rolls it is necessary to make as many stops during the 15 minute period as there are rolls in use. These frequent stops result in reducing the production of the machine to a very great extent and it is, therefore, desirable to avoid them.

The present invention provides means for automatically changing the feed of the web from an exhausting roll to a replacement roll by joining the web end of the replacement roll to the web running from the exhausting roll, and thereafter, severing the web of the exhausted roll, the entire operation being performed while the machine is operating at full speed.

Means also are provided for controlling the rotation of the roll during acceleration and deceleration of the machine. In the former case, to avoid imposing stress on the web during acceleration of the roll, and in the latter case, to check the momentum of the roll and prevent the formation of slack in the web.

It is known to those versed in the art, that better printed and folded products can be produced when the machine is operated at a constant speed, for whenever it is accelerated or decelerated, the operation of the printing mechanism and the folding and cutting mechanism is affected, an inferior printing and loss of correct registration may occur. The invention herein disclosed permits continuous operation of the machine at a constant speed and thereby avoids these difficulties.

The especial object of the invention is to provide a web supply mechanism for machines that run at high speed while operating upon a web of material, in which the web being fed from an exhausting web roll may be replaced with a web from a replacement roll without reducing the speed of the machine.

Another object of the invention is to provide a web supply mechanism in which the web from a replacement roll may be joined to the web of a running roll automatically when the latter becomes exhausted and without reducing the speed of the machine.

Another object is to provide a web supply mechanism having a rotatable web roll support in which rolls may be advanced automatically from loading to running position and having means for starting and accelerating the replacement roll to web speed preparatory to joining the end of the web thereof to the running web.

Another object is to provide a web supply mechanism having a web deflector adapted to press a running web against the periphery of a replacement roll, the said deflector being automatically moved into and out of web engaging position and having spring-actuated means for quickly deflecting the running web against the replacement roll.

Another object is to provide a web supply mechanism having a web deflector and improved automatically operated means for timing the operation of the web deflector with relation to a pasted area on the end of the web of a replacement roll.

Another object is to provide a web supply mechanism having improved means for severing the web of an expiring roll after the web of a replacement roll has been joined thereto, the operation of said severing means being co-ordinated with the joining of the webs, whereby the web will be severed a definite distance back of the point where the join is made, which distance will be substantially the same at every operating speed.

Another object is to provide a web supply mechanism in which the starting and stopping of a rotatable web roll support is governed by the radial dimension of a roll carried thereby.

Another object is to provide an improved web supply mechanism having means for accelerating a replacement roll and controlling its rotation during accelerating and decelerating periods when it becomes a running web roll.

Another object is to provide a web supply mechanism in which a plurality of roll controlling means acting on the surface of the roll are operated through a differential driving mechanism, thereby avoiding a tendency to loosen the outside layer of the roll.

Another object is to provide a roll control mechanism having means for accelerating a replacement web roll, which may automatically be stopped while the replacement roll is being brought into engagement with it, and which may automatically and gradually act to accelerate the roll to a peripheral speed substantially equal to that of a running web.

Another object is to provide an improved anchor device adapted to engage with a member that rotates with a web roll and that is arranged to hold a binder secured to the roll on the outer web end thereof.

Another object is to provide an improved means for securing the outer web end to the periphery of a replacement roll while it is being rotated in preparation for making a web join and for releasing the web end when a running web is pressed against it.

Another object is to provide a web supply mechanism in which the automatic operation of the device is accompanied by one or more signals indicating that the operation has started and/or that the operation has been completed.

Another object is to provide a web supply mechanism for automatically joining the web end of a replacement roll with a running web in which the functioning of the various components of the mechanism is automatically co-ordinated, and the entire operation may be performed without the assistance of an attendant.

It is also an object of the invention to provide a web supply mechanism of generally improved construction, whereby the mechanism will be simple and durable, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

The preferred embodiment of the invention is illustrated in the accompanying drawings, wherein:

Figure 1 shows a general view of the web supply mechanism as seen from one end of the device, and at the instant when the web of a replacement roll is being joined to the web running from a roll that has been reduced nearly to exhaustion;

Figure 2 shows a general view of the web supply mechanism as seen from the front or loading side of the device, and as seen in the direction of arrow F2 of Figure 1;

Figure 3 is a sketch showing a group of electric switches and a cam for operating them which is mounted on a web deflector shaft, the parts being shown in the relative position they occupy during the period of the operation shown in Figures 1 and 2 and as seen in the direction of arrow F3 of Figure 2;

Figure 4 is a sketch similar to Figure 3 with the web deflector shaft turned to raise the deflector to its inoperative position;

Figures 5 to 11 inclusive are diagrammatic sketches showing positions of some of the major components of the web supply mechanism during successive steps in its operation, as seen from the same end of the machine as Figure 1;

Figure 12 is a plan view partly in section showing portions of the web roll support as seen on the line F12—F12 of Figure 1 and in the direction of the arrow;

Figure 13 is an outside view of a portion of the head end pedestal of the web roll support, partly in section and partly broken away, showing certain components of the control mechanism, as they appear on the line F13—F13 of Figure 2 and in the direction of the arrow. In this view, the roll support is turned to bring one of the rolls to normal running position;

Figure 13A is a sketch showing a portion of Figure 13 with some of the parts moved to a different position;

Figure 14 is a view similar to Figure 13 but with the roll support turned as may be necessary for loading a web roll therein;

Figure 15 is a rear view of a portion of the head end pedestal showing certain parts of the control mechanism as seen in Figure 1 and in the direction of arrow F15 of Figures 13 and 14;

Figure 16 is a fragmentary view showing a portion of the head end pedestal as seen from the front or loading side of the support, and showing certain electrical switches and one of their operating cams as seen in the direction of arrow F16 of Figures 13 and 14;

Figure 16A is a fragmentary sectional view showing a switch operating cam for the upper switch shown in Figure 16;

Figure 17 is a sectional elevation showing details of a yoke on the commutator end of the roll support, with its cover plate removed and including electric switches and means for operating them, as seen in the direction of arrow F17 of Figure 2;

Figure 18 is a fragmentary detail view showing a portion of a follower arm indicated on Figures 13 and 17;

Figure 19 is another detail of the follower arm as seen in the direction of arrow F19 of Figure 18;

Figure 20 is an underneath view partly in section, illustrating the yoke shown in Figure 17, as seen in the direction of the arrow F20 of that figure;

Figure 21 is a sectional elevation of the yoke on the commutator end of the support similar to Figure 17, but showing details of the web severing mechanism;

Figure 22 is an elevation of the web severing mechanism as seen in the direction of arrow F22 of Figure 21 with the solenoid cover partly broken away;

Figure 23 is an underneath view of a portion of the web severing mechanism as seen in the direction of the arrow F23 of Figure 21;

Figure 24 is a detail view showing a portion of the web severing mechanism as seen in Figure 21, but with the shaft turned 90° to better show the arms;

Figure 25 is a plan view partly in section and partly broken away showing the web severing mechanism as seen in the direction of arrow F25 of Figure 21;

Figure 26 is an elevation of the web severing mechanism as seen in the direction of arrow F26 of Figure 25;

Figure 27 is a detail view of a portion of the web severing mechanism with the parts in the position which they occupy when the mechanism has been operated to sever a web;

Figure 28 is a view partly broken away, to show the face of the commutator for the electrical control circuits of the device as seen in the direction of arrow F28 of Figure 2;

Figure 29 is a sectional view of the commutator and adjacent parts as seen on the line F29—F29 of Figure 28 and in the direction of the arrow;

Figure 30 is a view as seen from the head end of the machine in the direction of arrow F30 of Figure 2, showing a portion of the adjacent yoke of the web roll support, and indicating certain of the operating members within and beyond the yoke;

Figure 31 is a view partly in section in a direction corresponding to Figure 15 showing a portion of the yoke and pedestal on one end of the roll support and a portion of the means for operating the switches;

Figure 32 is a plan view partly in section showing the mechanism of Figure 31 as seen in the direction of arrow F32 of that figure;

Figure 33 is an elevation of a portion of a roll supporting arm that is adjacent to the commutator end of the machine with its cover plate removed, and as seen in the direction of arrow F33 of Figure 2;

Figure 34 is a sectional view of the roll support arm shown in Figure 33 as seen in the direction of arrow F34 of Figure 33;

Figure 35 is a sectional plan view of a portion of the arm shown in Figure 33 as seen in the direction of arrow F35 of that figure;

Figure 36 is a face view of a holder for a web binder cutter with its cover plate removed and as seen in the direction of arrows F36 of Figures 2 and 37;

Figure 37 is a sectional elevation through the holder for a binder cutter, as seen on the line F37—F37 of Figure 36;

Figure 38 shows the chief components of one of the web binder cutters as seen in Figure 1 and in the direction of arrow F38 of Figure 2;

Figure 39 is an end view of the binder cutter as seen in the direction of arrow F39 of Figure 38;

Figure 40 is a sectional view showing a portion of the binder cutter as seen in the direction of arrow F40 of Figure 39;

Figure 41 is a sectional view showing the binder clamp as seen on the line F41 of Figure 38 in the direction of the arrow;

Figure 42 is a sectional view showing the adjusting mechanism for the binder cutter head as seen on the line F42 of Figure 38 and in the direction of the arrow, and showing the clamping mechanism in locked position;

Figure 43 is a view similar to Figure 42 with the parts in the unlocked or open position;

Figure 44 is a view partly in section showing the adjusting mechanism for the web binder cutter as seen in the direction of arrow F44 of Figure 43;

Figure 45 is a view showing the binder cutter holder on the commutator end of the support and the web cutter timer as seen in the direction of arrows F45 of Figure 2;

Figure 46 is a sectional view through the binder cutter holder and web cutter timer shown in Figure 45 as seen on the line F46—F46 of that figure and in the direction of the arrow;

Figure 47 is a view partly in section showing the web roll accelerating and decelerating mechanism as seen from the head end of the machine and as depicted in Figure 1;

Figure 48 is a fragmentary plan view showing a portion of the roll accelerating and decelerating mechanism as seen in the direction of arrow F48 of Figure 47;

Figure 49 is a fragmentary view partly in section of a portion of the roll accelerating and decelerating mechanism as seen in the direction of arrow F49 of Figure 47;

Figure 50 is a fragmentary sectional view showing the frame for the web roll accelerating and decelerating mechanism as seen on a line F50 of Figure 47 and in the direction of the arrow;

Figure 51 is a plan view mostly in section, showing a drive shaft and other details of the mechanism associated with the web roll accelerating and decelerating means;

Figure 51A is a fragmentary view showing the clutch operating mechanism as seen in the direction of arrow 51A of Figure 51;

Figure 52 is a view partly broken away showing a portion of the web deflector support as seen in the direction of arrow F52 of Figure 1;

Figure 53 is an underneath view of the web deflector support as shown in Figure 52;

Figure 54 is a sectional view of a portion of the web deflector support as seen on the line F54 of Figure 52 and in the direction of the arrow;

Figure 55 is a sectional view of the web deflector support as seen on line F55 of Figure 52 and in the direction of the arrow;

Figure 56 is a plan view partly in section showing the differential drive and control mechanism for accelerating and decelerating web rolls;

Figure 57 is a view showing a portion of the control mechanism and particularly the brake mechanism shown in Figure 56 as seen in the direction of arrow F57 of that figure;

Figure 58 is a projected view showing a portion of the control mechanism as seen in the direction of arrow F58 of Figure 57; and Figures 59 and 59A show in diagrammatic form, the electrical switches employed in the control of the web roll supply mechanism and their wiring connections.

Referring to Figure 2 of the drawings, numeral 2 indicates a sub-base frame or support for a machine designed to operate upon a web. Numerals 3 and 3' indicate columns designed to support base frames 4 and 4' on which printing units or other machinery, not included in the invention, may be carried. Pedestals are indicated at 5 and 5' which rotatably support journal shafts 6 and 6' that are formed integral respectively with yokes 7 and 7'. Spreader shafts 8 and 8' have reduced end portions which are fitted to bores in the yokes 7 and 7' and shown in greater detail in Figure 20, and are secured in place by nuts 9. Cross-heads 11 and 11', shown also on Figure 12, are slidably supported on the shafts 8 and 8' and may be secured thereto in any desired position by set screws 12. Cross-heads 11 and 11' are provided respectively with spindles 13 and 13' which, as shown in Figures 37 and 46, are rotatably supported and adapted to carry web rolls so that webs may be fed successively therefrom to the machine. These spindles are formed to fit the cores of the web rolls and are preferably provided with keys which engage key rests in the cores in accordance with the usual practice.

Spindles 13 are carried in both ends of the cross-head 11 and are arranged to be adjusted axially by means of a handle 14. Details of the spindle adjusting mechanism are not shown in this application as they are fully disclosed in application filed Jan. 23, 1932, Serial No. 588,301. The spindles 13', which are mounted in both ends of the cross-head 11' and are shown in Figure 46, are coupled to the shaft of a tension mechanism indicated generally by the numeral 15. The details of the tension device are disclosed in application Serial No. 551,082 filed July 16, 1931.

Means are provided for rotating the support to advance the rolls from loading position to running position, and include a gear 16, shown in Figure 1, secured to the shaft 6. This gear meshes with a pinion 17 which is rotatably supported on a stud 18, the pinion being secured to a worm wheel 19 which meshes with a worm 21, which is driven by an electric motor 22, secured to the pedestal 5. Follower fingers 23 and 23' are supported respectively on follower arms 24 and 24' which are attached respectively to shafts 25 and 25′, these parts being shown in Figure 1 and also in more detail in Figures 17 to 20, 30 and 31.

Means for securing the outer end of the web of a roll preparatory to putting it into service preferably comprise web binder straps 26, pasted on the end of the web, which is severed in a fish-tail formation, as shown in Figure 2. A suitable adhesive is applied to the web end over or adjacent to the binder straps which are made long enough to extend beyond the end of the roll. These straps are preferably secured to a web binder anchor, indicated generally at 27 in Figure 1, the clamping mechanism being shown in detail in Figures 36 to 44 inclusive. The binder straps and mechanism for securing them are disclosed in application Serial No. 578,270 filed Dec. 1, 1931.

As shown in Figure 1, an expiring web roll is indicated at 28 and a replacement web roll at 29. A web W is running from the expiring roll to a guide roller 31 and is being pressed against the surface of the roll 29 by means of a web deflector or presser member which may be a brush 32, or other similar device carried on a presser bar 33 supported by arms 34 and 34′ secured to shaft 35, that is rotatably supported in bearings formed in brackets 36 and 36′ secured respectively to the frames 4 and 4′. Means for rotating the shaft 35 to move the web deflector from the dotted position shown in Figure 1 to the position shown in full lines and back again, include a motor indicated at 37, which is preferably connected to a double reduction worm gear mechanism indicated at 38, having an output shaft 39 to which a crank 41 is secured. The free end of the crank is pivotally connected to one end of a connecting rod 42, the opposite end of which passes through a poppet connection 43 pivotally supported in an arm 44 secured to the shaft 35. The motor acting through the reduction gear thus rotates the crank 41, which in turn, swings the arms 34, 34′ between the full line and the dotted line positions as indicated in Figure 1. It will be observed that when the crank is in the lower dead center position, the web deflector is moved into contact with the running web and when the crank is in the upper dead center position, the web deflector is moved backward to the inoperative position shown in dotted lines in Figure 1.

A spring 45 is carried by the connecting rod 42 and acts to bias the arm 44 in a clockwise direction as shown in Figure 1. This action is resisted under certain conditions by a swinging arm 46 which is pivotally supported at 47 and may be attracted by the pull of a trip magnet 48. The free end of the arm 46 engages with an arm 49 secured to the shaft 35.

It will thus be understood that when the magnet is energized the lever 46 will be held into an interfering position with the arm 49 and prevent the arms 34 and 34′ from completing their stroke, under which condition the spring 45 will be compressed and a space opened between the poppet connection 43 and the lock nuts 51 on the end of the connecting rod 42. Hence, the brush 32 will be prevented from moving further than into contact with the running web W. When the winding of the trip magnet 48 is de-energized the arms 34 will be released, allowing them to move into the position shown in full lines in Figure 1, in which the running web is pressed against the replacement roll.

Electric switches for starting and stopping the motor 37 and for controlling the tripping motion of the web deflector arm are provided, and their operation will be more fully explained hereinafter. In Figures 3 and 4 three of these switches are shown operated by a cam 52 secured to the shaft 35. Switches 53 and 54 are limit switches which act to stop the motor when the presser arms are up and down respectively. In Figure 3 the switch 54 has been operated by the high spot on the cam 52 and in Figure 4 the switch 53 has been similarly operated. Switch 55 is in the circuit of the magnet 48 and is energized when the web deflector is in the down position and the switch is engaging the low portion of the cam, as shown in Figure 3. Means for rotating the replacement roll preparatory to joining the end of the web therefrom to the running web, include the belts 56 and 56′ which are driven by pulleys 57 and 57′ carried on a shaft 58 and driven therefrom by means of a differential gearing indicated generally at 59. Frames 61 and 61′ are formed with bearings in which the shaft 58 turns and serve to support idler pulleys 62 and 62′ and take-up pulleys 63 and 63′. The frames 61 and 61′ and their associated components are identical and the frame 61 and its associated components are shown in detail in Figures 47 to 50 inclusive. The take-up pulleys are each rotatably supported in a bearing formed in a bifurcated member 64 arranged to slide in openings 64′ formed in the frame 61 or 61′. The bifurcated members are each secured to a cable 65 which passes over a sheave 66 and is connected to one end of a spring 67, the other end of which is anchored on a stud 68 secured to the frame 61 or 61′.

The shaft 58 is preferably driven through a differential gear mechanism contained in a housing indicated at 69 which is secured to the frame 4, and shown in detail in Figure 56. This shaft is rotated in a definite relation to the speed of the machine either by connection thereto or by other convenient means. As shown in the drawings, the driving side of the differential carries a miter gear 71, which meshes with a miter gear 72, see Figure 2, on a vertical shaft 73, that is rotatably supported in a bracket 74, secured to the frame 4. A bevel gear 75 is secured to the upper end of the shaft 73 and meshes with a bevel gear 76, secured to a main driving shaft 77 from which other portions of the machine may be driven.

As shown in Figure 1, one end of a chain 70 is secured to the frame 61 and the other end may be secured to any convenient support. This provides means for supporting the frame and the parts carried thereby, when the roll support is turned to move the running roll out of engagement with the belts.

Figures 5 to 11 show diagrammatically, several positions of the web roll support and rolls carried thereby, during successive steps in the operation of the mechanism. Thus, in Figure 5, a running roll is shown in the upper or normal running position and a replacement roll in the lower or loading position. The belts 56 are shown in contact with the running roll and may serve to control its rotation when the machine is accelerated and/or decelerated. In Figure 6, the running roll has been considerably reduced in diameter, although it will be noted that the belts 56 are still in contact therewith, and the follower finger 23 is still in contact with the surface of the web roll. The motion of the follower finger at this point is utilized to actuate a switch 102 in circuit with the motor 22 and thus rotate the roll support in a clockwise direction.

In Figure 7, the support has been rotated to bring the replacement roll into contact with the belts, which at that time have been disconnected from their driving mechanism. After the replacement roll is engaged by the belts, they are coupled to their driving means and the web roll is thus accelerated to the speed of the running web. The rotation of the support is continued until it reaches the position shown in Figure 8.

In this position, the follower finger that is in contact with the replacement roll acts through suitable mechanism hereinafter described to de-energize the motor 22 and stop the support so that the replacement roll is closely adjacent the web running from the running roll. The bar carrying the web deflector has meanwhile been swung downward to its operative position and is ready to make a join in the web when the running roll expires.

In Figure 9, the running roll is exhausted to the desired extent and the follower finger in contact therewith has moved to a position where it actuates a switch 103 in the circuit of the trip magnet controlling the web deflector which is then swung towards the replacement roll as shown in Figure 10, pressing the old web against the adhesive on the surface of the new roll. The binder holder 27, which has held the end of the web of the replacement roll in contact with its periphery, then strikes the deflector bar as shown in Figure 10, and severs the binders, allowing the web of the replacement roll to adhere to the running web and be carried forward to the machine. The action of the binder holder in striking the deflector bar, results in closing a circuit to a web severing mechanism which then severs the web of the expiring roll. The replacement roll thus becomes a running roll as shown in Figure 11, which also shows the web deflector moved to the inoperative position. The expired roll may then be removed from the support and a fresh roll put in its place, when the conditions will be the same as shown in Figure 5.

Referring to Figure 13, this shows the relative position of an exhausting web roll 28 and a replacement roll 29 when the roll support has been turned to bring the periphery of the replacement roll adjacent the web running from the roll 28 and the roll support has been stopped in the correct position for making the web join. It will be noted that the follower finger 23 is bearing against the periphery of the replacement roll 29.

The shaft 25 is connected to an arm 78, to which a cam member 79 is adjustably secured. This cam member is shown in engagement with a roller 81, carried on an arm 82, of an electric switch indicated generally at 83, which is secured to the pedestal 5 and acts to interrupt the circuit of the motor 22. It will be seen that a variation in the position of the follower finger 23 will result in a motion of the cam member 79 about the axis of the shaft 25 which may cause operation of the switch 83 earlier or later during rotation of the roll support, the point of operation being governed by the radial dimension of the replacement roll 29. Hence, the mechanism can be made to act to stop the rotation of the support when the periphery of the roll is at the desired distance from the running web.

Similarly, the follower finger 23' is connected to the shaft 25', which in turn is connected to an arm 78', carrying a cam 79', which is similarly effective when the roll support is rotated about its axis through an arc of 180°. Other views of these parts are shown in Figures 30 to 32 inclusive.

In Figures 30 to 32, means are shown for holding each of the follower fingers against the periphery of the web rolls, and include springs 84, each having one of their ends connected to an arm 85, secured to a gudgeon 86, which in turn is secured to the shafts 25 or 25', the other end of the spring 84 being secured to a stud 87 that is held in the yoke 7. The gudgeons 86 are secured to their shafts 25 or 25' as the case may be, and are supported in bearings 88 held in the yoke 7.

In many printing plants the web rolls are brought to the web supply mechanism on wheel trucks. In order to transfer them to the arms of the roll support, the latter are turned to raise or lower the spindles carried thereby to align them with the core of the roll. In the mechanism described herein the usual means are provided for manually controlling the movement of the support for roll loading.

In Figure 14, the roll 29 in the upper end of the support has been partly exhausted and the support has been turned counter-clockwise, under manual control as may be necessary to load a new roll into the position previously occupied by the roll 28. In such case, the follower finger 23 would extend across the path of the running web if the finger was maintained in contact with the roll.

Means for moving the follower finger back to avoid the web when the roll is thus turned however, is provided, and includes an arm 89, pivotally supported on the pedestal 5, and biased in a counter-clockwise direction by a spring 91. The arm 89 carries a finger 92, pivotally supported on the free end of the arm 89, the finger being formed in the manner of a bell crank lever having a projection 92' which is connected by a spring 93 to the arm 89, and the finger is thus biased into the position shown in Figure 13.

The arms 78 each carry a roller 94, one of which engages with the finger 92 when the roll support is turned counter-clockwise toward the position shown in Figure 14. The effectiveness of the spring 91 is made greater than that of the springs 84, and in consequence, when the roller 94 engages with the blade 92, the finger 23 is moved away from the surface of the roll, and as the support is turned toward the position shown in Figure 14, the back of the finger 23 comes to a stop against the shaft 8. Further motion of the roll support in the counter-clockwise direction then results in moving the arm 89 against the tension of the spring, as shown in Figure 14.

As the support is returned to its former position after loading the new roll therein, the motion of the arm 89 and the follower finger 23 will be reversed and they will return to the positions shown in Figure 13.

With a full size roll in the end of the support occupied by the roll 28 in the drawings, the follower finger 23' is moved backward to an extent that causes the roller 94 to assume a position with respect to the axis of the support, that is diametrically opposite to the roller 94, as shown in Figure 13. With it in this position, when the support is rotated clockwise to bring this roll into running position, the finger 92 will obstruct the passage of the roller 94. However, the pivoting of the finger 92, as previously explained, allows it to recede and permits the roller to pass as shown in Figure 13A.

A switch 95 is secured to the pedestal 5 and has an operating arm 95' which is connected to the arm 82 of the switch 83 by a link 96, having a slot 96' whereby the arm 82 may have an initial movement before the arm 95' is engaged. The function of this switch is to give a signal and to prevent automatic operation of the web joining mechanism if the operator should fail to return the support to the correct running position after loading a new roll.

Electric switches 97 and 98 are also mounted on the pedestal 5 and have operating arms and rollers indicated at 97' and 98' respectively and are supported on the opposite side of the pedestal 5 from the switches 83 and 95. The roller 97' is operated by cams 99, secured to the gear 16 and the roller 98' operated by cams 101, also secured to the gear 16. There are two of each of these cams at diametrically opposite points on the gear 16 as shown in Figure 14. It will be understood that rotation of the support through 180° causes the operation of these switches. Other views showing these electric switches and their operating means are shown in Figures 16 and 16A.

Switches for energizing the reel turning motor when a running roll reaches a pre-determined diameter are actuated through rotation of the shafts 25 and 25' by the follower fingers. These switches are shown in Figure 17 and are indicated at 102 and 102'.

A similar switch is also indicated at 103' in Figure 20, and it will be understood that there is also a corresponding switch 103 located behind the switch marked 102 in Figure 17 thus duplicating the arrangement shown in Figure 20. The switches 102 and 102' are provided with operating arms 104, secured to shafts 100. Threaded connections 105 are pivoted to the arms 104. These connections are screwed into slotted links 106, which in turn engage with pins 107 secured to plates 108, that are secured to gudgeons 109, connected to shafts 25 and 25'. These gudgeons carry anti-friction bearings indicated at 111, by means of which the shafts 25 and 25' are rotatably supported in the yoke 7'. Threaded plugs 112 act as thrust members to prevent axial motion of the shafts 25 and 25', and being removable, they permit threading the shafts through the yokes for convenient assembly.

The plates 108 also carry pins 113 that engage with links 114, by means of which arms 104 on the switches 103 and 103' are operated. Handles 116 are connected to the shaft 100 and provide means for manually operating the switches 102 and 102' under emergency conditions, and similar handles 117 serve to operate switches 103 and 103'. It will be seen that the movement of the follower fingers 23 or 23' results in operating the switches 102 or 102', which may be termed a "first actuating means", after it has been moved a sufficient distance for the pin 107 to engage with the end of the slot 106', and on further motion of the follower finger, the pin 113 will engage with the end of a slot 114' in the link 114 and thus operate the switches 103 or 103', which may be called a "second actuating means".

Thus, as the web is unwound from the roll and it is exhausted to a pre-determined point, the switch 102 or its mate 102' will operate, depending on which end of the roll support is in use, and on further unwinding of the web, the switch 103' or its mate will be energized. The switches 102 and 102' are employed to start the rotation of the support when the running roll reaches a desired diameter, and the switch 103' and its mate are employed to energize the mechanism for bringing the web deflector into position for pressing the running web against the replacement roll.

As shown in Figures 18 and 19 the follower arms 24 and 24' are provided with spring-supported pins 118 which are held in sockets formed in the shafts 25 and 25' by means of springs 119 which abut against nuts 121 screw threaded into arms 24 or 24'. Knobs 122 provide means for withdrawing the pins from engagement with the shafts, whereupon the arms may be moved lengthwise on the shaft to locate them in other positions.

In practice the arms are so located that they will bear against the periphery of the roll within one of the areas that are engaged by the belts 56 and 56', the adjustable feature being provided so that a half length roll carried adjacent to either end of the support may be engaged by the follower fingers, in which case but one of the belts would be used and both fingers would be placed in alignment with the belt.

Mechanism for severing the web of the expiring roll is provided in duplicate and includes solenoids and coacting mechanism shown best in Figures 21 to 27 inclusive. The solenoids 123 are supported on frames 124 and provided with cores 125, which are pivotally connected to links 125', which in turn, are connected to arms 126 that are secured to shafts 127 rotatably supported in brackets 128 secured to the yoke 7'. Other arms 129 are secured to the shafts 127 which are pivotally connected to terminals 131 which are secured to a web severing member, which may be a wire, as indicated at 132. Similar terminals are used on both ends of the severing member, the second one being connected to arms 133 pivotally supported on shafts 133' and carried in brackets 134 secured to the yoke 7. Springs 135 and 136 are arranged respectively on shafts 127 and 133' and act to bias the arms into the position shown in full lines in Figure 25, and it will be understood, that when the solenoid is energized the plunger will be attracted and the arms moved to the position shown in dotted lines in Figure 25, which motion intersects the course of the running web and effects its severance.

Grooves 137 are provided in the shafts 8 and 8' within which the severing member is supported while in the inactive position. It is thus held out of the path of the running web and is guarded against injury when loading the rolls.

The commutator or selector for completing the electrical circuits to the rotating portion of the roll support is shown best in Figures 28 and 29. A cover 138 is mounted on the pedestal 5' as indicated in Figure 2, and secured by nuts 139 which are screw threaded on studs 141, which in turn, are threaded into the pedestal 5'. A commutator support 142 is secured to the shaft 6' by screws 143, as shown, and carries insulating rings 144 and barrier rings 145. Contact segments, indicated generally by the numeral 146, are held in certain cutaway portions of the insulating rings, as shown in Figure 28, by their dovetail formation as shown in Figure 29. Pins 147 are secured in the barriers, the insulating rings, and in the commutator support 142, and serve to prevent rotation of the segments relative to the supports and to each other. Leads indicated generally with the numeral 148, extend from the contact segments to the solenoids of the web severing mechanism and to the control switches, carried on the yoke 7'. Brushes, indicated generally by the numeral 149, are supported in suitable brush holders 151 and arranged to bear against the contacts 146. The brush holders are carried on studs 152 supported in rings 153 and 154 which are formed of insulating material. The ring 154 carries connection straps 155 which serve to connect the studs 152 with terminals 156, from which wires are led to the control board.

The rings 153 and 154 are held in spaced relation by studs 157 which are protected by tubes of insulating material, indicated at 158. The rings and the brush mechanism thus constitute a unit, which is held against rotation by the studs 141 which pass through both rings and are also protected by these tubes 158. A washer 159 is interposed between the outside barrier and one side of the ring 154 and an annular member 161 is formed with a flange 161' which engages the outer surface of the ring 154.

The brush mechanism is thus secured to prevent axial motion with respect to shaft 6', but it will move axially with the shaft 6' when the latter is moved endwise to effect side adjustment of the web, provision for such motion being made to the extent indicated by the dotted line within the cover 138. Means for moving the pedestal 5' to effect this action being well known, it is thought unnecessary to describe it.

It will be seen that this assemblage holds the brush mechanism against rotation when the shaft 6' is rotated, but permits it to move axially when the roll support is so moved for margin adjustment of the web.

The mechanism for timing the operation of the web deflecting member 32 with respect to the rotation of the web binder anchor 27 includes timer contacts best shown in Figures 45 and 46. As shown in Figure 46 the spindle 13' is provided with a roller bearing 162 and a ball bearing 163 whereby it is rotatably supported in a holder 164 that is secured to the cross-head 11'. A ring 165 is secured to the holder 164 and serves to hold the bearing 163 in position with respect thereto, and a nut 166 screw threaded on the spindle 13' serves to prevent axial motion thereof, with respect to the cross-head 11'. The spindle 13' is provided with a key 167 which engages with a coupling 168 that is secured to a shaft 169 and forms the rotating element of the tension mechanism 15, hereinbefore mentioned.

A ball bearing 171 has its inner element secured to the spindle 13' and its outer element is clamped to a housing 172 by means of a ring 173 which is secured thereto. A ring of insulating material, indicated at 174 and barriers 175 are secured to the housing 172 by means of screws 176. A portion of the ring 174 is cut away and a segmental contact 165 inserted therein as shown in Figure 45, the contact being held in place by its dovetail formation as shown in Figure 46.

Brushes 178 and 179 are supported in suitable brush holders 180, which are carried on studs 177 secured to a brush holder plate 181 formed of insulating material and secured to the holder 164 by screws 181'. Connecting straps 182 connect the brush holders with terminals 183 from which leads are carried to and through the take-up mechanism shown in Figures 33 to 35. Two conductors extend from the terminals 183 as shown on Figure 45 and two additional leads from the corresponding parts on the opposite end of the cross-head 11' and they join in a junction box indicated at 184, from which a four-conductor cable indicated at 185 is led around the take-up sheaves 186 and 187 and thence around the guide pulley 188 to an anchorage on the yoke 7'. The cable is anchored at a point adjacent to the junction box 184 by means of a clamp 189.

Sheaves 186 are rotatably supported on a stud 191 secured to the back of the cross-head 11' and the sheaves 187 are supported on a stud 192 held in a sliding head 193, adapted to slide on rods 194 supported by a bracket 195 and studs 196. Springs 197 bias the sliding head to the position shown in Figure 33, and it will be understood, that when it is necessary to move the cross-head 11' along the shafts 8 and 8' and in a direction away from the yoke 7', to which one end of the cable is anchored, in order to support a one half length roll at the left end of the support as seen in Figure 2, the springs will allow the cross-head 11' to be moved along the shafts 8 and 8' and thus pay out the necessary length of cable.

The end of the web of the replacement roll will be securely held in place during the interval in which the roll is being accelerated to the speed of the running web by the binder straps 26 shown in Figure 2. A portion of each binder strap is allowed to project beyond the end of the roll. This projecting portion indicated at 198 in Figures 38 and 39, is then threaded through the jaw 199 of the head 201 of the binder anchor that is indicated with the numeral 27 in Figure 1 and shown in detail in Figure 39. The projecting portion of the binder is then secured as shown in Figures 38 and 41, by operation of the clamping lever 202 which is pivotally supported on a shaft 202'.

It will readily be seen that pressure on the lever 202 will clamp the binder 198 against the surface 203 of the anchor head. Provision is made to adapt this device to rolls of varying radial dimension, as shown in Figures 38, 42, 43, and 44. The head of the anchor 201 is adjustable relative to the attaching slide 204 by a clamping mechanism having a lever 205 that is formed with twin eccentric hubs 206. A pivot pin 207 is secured to the hubs and pivotally supported in a poppet connection 208, which is secured to the head 201. The twin forks of the attaching slide 204 are fitted to slide in ways 209, and provided with notches or teeth 211 which engage with similar teeth in a locking plate 212. Springs 213 are interposed between the head 201 and the locking plate 212, and a spring 214 is interposed between the locking plate 212 and a clamping plate 215. It will be understood that when the lever 205 is turned to the position shown in Figure 42, the slide 204 will be locked with relation to the head 201, and when the lever is turned to the position shown in Figure 43, the parts will be unlocked due to the rotation of the eccentric hubs 206. Means are thus provided for locking the head in any desired position to accommodate rolls of varying diameter.

Mechanism for severing the binder straps includes a knife 216, supported on a pivot 217 and having an arm 216' to which a spring 218 is attached, and which acts to bias it to the position shown in Figure 39. A plunger 219 is fitted to slide in a bore in the head 201 and carries lugs 221 and 222, the former being arranged to engage with the bell crank arm 216' of the knife 216. The lug 222 is arranged to be engaged by the presser bar 33, as indicated in Figure 1, from which it will be understood that when the lug 222 strikes the presser bar, the knife 216 will sever the binder 198, thereby releasing the end of the web from the roll.

The housing 172, as previously described, is rotatably supported on a spindle 13', as shown in Figure 46. A similar housing 223 is (Figures 36 and 37) similarly supported with respect to the spindle 13 by ball bearings 224, the outer member of which is secured to the housing by the ring 225. The parts contained within the housings 172 and 223 are similar, but they are made right and left-hand. In each housing there is a clutch arm 226, pivotally supported on a pivot pin 226', one end of which is held in the housing and the other end in a cover plate 227. The clutch arm carries a poppet connection 228 which is pivotally connected thereto and which is bored to receive a threaded stud 229 bearing an adjusting nut 231, and having its opposite end shaped to receive a clutch band 232 which is secured thereto. The opposite end of the clutch band is secured to a lug 233, supported on a pin 234, secured to the housing 172 or 223, as the case may be. The clutch band carries a lining 235 which is adapted to engage the periphery of the spindles 13 or 13'. A spring 236 is interposed between the poppet connection and the head of the rod 229 and tends to release the clutch band from engagement with the spindle. The clutch arm also carries a pin 237, pivotally connected to a rod 238 which passes through a hole in the housing and carries a spring 239, a cap 241 and an adjusting nut 242. The spring, it will be noted, tends to bias the clutch arm in a counter-clockwise direction as shown in Figure 36, and in a clockwise direction as shown in Figure 45. Latches 243 are carried in grooves in the clutch arms 226, and pivotally connected thereto by pins 244. The latches are formed with engaging faces 245 and 245' which are adapted to engage with an abutment 246 secured to the housing. The latches are also formed with a finger hold at 247 for convenience in operation, and are held with their engaging faces against the abutment 246 by means of springs 248. The attaching slides 204 are secured to the clutch arms by bolts 249.

With the parts in the position shown in Figures 36 and 45, the clutch band is in engagement with the spindles and will be rotated when the roll is turned. With the spindle 13 rotating in a counter-clockwise direction, as shown in Figure 36, and the clutch member in engagement with the spindle 13, the binder anchor is rotated with the roll. However, when the anchor head meets an obstruction, its motion is arrested and the housing tends to continue its rotation, thus moving the abutment 246 relative to the latch 243 and out of engagement with the engaging face 245 and into engagement with the face 245'. This motion of the clutch arm relative to the housing results in disengaging the clutch band and allowing the binder head to stop, although the spindle continues to rotate.

The clutch mechanism shown in Figure 45 operates in the same manner except that the spindle 13' turns in a clockwise direction as shown in Figure 45, and in consequence, the arrangement of the parts is reversed.

Mechanism for driving the pulleys 57 and 57' which are carried on the shaft 58, includes the differential 59 shown in detail in Figure 51. A spider 251 is keyed to the shaft 58 and is formed with arms 252, on which bevel gears 253 are rotatably supported. These gears mesh with bevel gears 254 and 254', each of which is formed on a shell 255, provided with bushings 256 and 257, whereby it is rotatably supported on the shaft 58. The shells carry bearings 258 which in turn carry housing rings 259, which with an outer tube 261 serves to enclose the differential gears. The shells 255 are formed with inclined surfaces 262 on which correspondingly inclined surfaces of the expansible pulleys 57 and 57' are fitted to slide. The segments of the expansible pulleys are secured to ring segments 263, which engage a groove in a nut 264, screw threaded on the shell 255, from which it will be seen that by turning the nut, the pulley segments will be moved axially of the shaft and the diameter of the pulley will thus be increased or diminished to a certain extent as desired.

Rotation of the shaft 58 results in driving the pulleys 57 and 57' through the differential 59. Without the differential, any difference in the thickness of the belts 56 and 56', or any variation in the diameter of the web roll at the two places engaged by the belts, would cause a slipping action between one or both of the belts and the surface of the roll which would tend to loosen the outside layer of paper from the roll. This tendency is avoided by driving through the differential which thus permits both of the belts to accommodate themselves to any irregularities in the belts or in the web roll.

Bearings 265 have their inner members fitted to the shell 255 and the outer members fitted to housing rings 266 which are connected to the housing rings 259 by cross members 260 which serve to hold the side members of the frame 61 and 61' in proper spaced relation. The shaft 58 is rotatably supported in bearings located in the brackets 266' which are secured to the frames 4, 4'. A clutch member 267 is secured to the outer end of the shell 255, as shown at the left-hand side of Figure 51, and engages with a sliding clutch member 268, arranged to move axially of the shaft 58, whereby the shell 255 may be connected to or disconnected from the shaft at will. A spring 269, one end of which abuts against a counterbored collar 271 acts to bias the sliding clutch member 268 into engagement with the clutch member 267. Means for locking it out of engagement, see Figure 51A, are provided by a rotatable member 270 pivotally supported on a stud 270' secured to the shaft 58. The rotatable member is provided with a recess 272 adapted to receive a tool whereby it may be turned, and a stay pin 272' is threaded into the member and engages a slot in the stud 270, thereby holding it in place. The rotatable member 270 carries a roller 273 adapted to engage with a wall of a chamber 274 to hold the clutch out of engagement, which is the normal running position. When only one of the drive belts 56 and 56' are to be used, as in the case of feeding from a roll having half the length of a full roll, the member 270 is turned to the position shown in dotted lines in Figure 51A, and allows the pressure of the spring 269 to force the clutch member 268 into engagement with its mating member 267. The differential 59 is thus rendered ineffective and the pulleys 57 and 57' are both positively driven at the speed of the shaft 58.

The differential gearing by which the shaft 58 may be driven from the main shaft of the machine, and which is enclosed within the housing indicated at 69 in Figure 2, is shown in detail in Figure 56, and its associated mechanism in Figures 57 and 58. The shaft 58 is rotatably supported in suitable bearings 275 carried by the housing and carries a bevel gear 276 secured to the shaft.

The miter gear 71 is secured to a shaft 277, supported in a bearing 278 and secured thereto is a miter gear 279. A miter gear 281 is carried on one arm of a spider 282 and meshes with the miters 276 and 279. A differential shell 283 is secured to the spider 282 and is rotatably supported in the housing 69. A gear ring 284 is secured to the differential shell 283 and meshes with a bevel gear 285, secured to a shaft 286, to which a brake sheave 287 is also secured, the shaft being rotatably supported in a bearing 288 formed in the housing 69.

The brake sheave 287, as shown in Figure 57, is engaged by a band brake 289 resiliently supported at 291, the ends of the brake band being connected to a toggle mechanism of standard construction indicated generally at 292 and operated by a magnet having a winding 293 and an armature 294.

The magnetic brake may be of any standard form and it is therefore unnecessary to describe all of its details, as it will be understood that when the coil is energized, the armature is attracted and the brake is released, the de-energizing of the winding acting to release the armature whereupon the brake is applied by a spring 295.

A solenoid having a winding 296 is supported in a frame 297, suitably mounted in fixed relation with the brake mechanism. The solenoid is provided with a plunger 298, connected to a link 299 which is also pivoted to an arm 301 of a bell crank lever pivoted on the armature 294, by means of a pin 302. A link 303 is provided with a pivot pin 304 operating in a slot in the arm 301' of the bell crank lever. A second bell crank lever having an arm 305 is connected with the link 303 and pivoted on a fixed support at 306. The arm 305' of this bell crank lever engages the piston rod of a dash pot 307, having a piston 308. The under side of the piston is fitted with a common type of flap valve 309 and a regulating screw 311. The dash pot is pivotally supported by means of a bolt 312, and a relatively light spring 313 within the dash pot acts to hold the piston in its uppermost position.

A rod 314 is connected to the plunger 298 and carries a contact 315 which is arranged to bridge contacts 426 when the winding is energized and the plunger is raised.

It will be seen that the brake can be released or quickly applied to the sheave 287 with the parts in the position shown in Figure 57, but when the solenoid 296 is energized, the bell crank levers will be turned to straighten out the toggle connection formed by the arm 301 and the link 303, and that motion of the armature 294 away from the brake member will then be resisted by the dash pot. This arrangement permits the brake to be applied gradually and thus effect a gradual acceleration of the belts 56 and 56' when a replacement roll is being accelerated, and when the solenoid 296 is not energized the brake can be applied instantly to accelerate or decelerate the roll in synchronism with the speed of the machine when the machine speed is changed for any reason.

The support for the web deflector which is indicated at 33 in Figure 1, is shown in detail in Figures 52 to 55 inclusive and is preferably formed with an I-beam section and of a light-weight alloy in order to avoid unnecessary weight. This is bolted to the arms 34 and 34' which are also preferably made of a light-weight alloy and the brush 32 or any other suitable deflector is secured to the bar as shown in Figure 1. An abutment holder 317 is secured to one end of the bar 33 and carries a resilient abutment block 318, which is adapted to be engaged by the head 201 of one of the binder anchors. Brackets 319 are secured to the bar 33 and rotatably support a shaft 321 to which trip plates 322 are secured. Four of these trip plates are furnished as indicated in Figure 2, in positions to be operated when using full length rolls, or either three-quarter length rolls or half length rolls that may be carried at either end of the rotatable support, it being understood that the crossheads 11 and 11' will be moved along the shafts 8 and 8' to accommodate rolls that are less than full length at either end of the support.

Each trip plate also carries an abutment block 318. A similar abutment block 323 is held on the opposite side of the trip plate and the downward motion of the trip plate about its pivot is limited by lock nuts 324 on a stud 325, secured to the bar 33. The shaft 321 has an arm 326 secured thereto, the free end of which is pivotally connected to a rod 327, as shown in Figure 1. The opposite end of this rod is pivotally connected to an arm 328, best shown in Figure 1, which serves as an operating means for a switch 329, the contacts of this switch being in the circuit of the web severing mechanism.

Means for rotating the web roll support under manual control, for loading new rolls, is provided by means of a push button control station indicated at 331 in Figure 2. A safe switch is included therein whereby the automatic control may be made ineffective if desired. The circuits of this push button station are inter-connected with those for the automatic operation and all are fully disclosed in the diagram shown in Figures 59 and 59A.

The operating handles on the switches 102 and 102' permit operation of these switches manually if it is desired to rotate the web roll support to bring a replacement roll into running position before the running roll is reduced to the diameter where the support would be turned automatically, and the switches 103 and 103' may be similarly operated to make a web join before the running roll is exhausted.

In the operation of the device, when a new roll is to be loaded into the support, the attendant presses either the "forward" or "reverse" button of the control station as may be necessary to align the spindles of the support with the core of the web roll. The spindle operating handle is next turned to force the spindle into the roll and the support "reversed" to raise the roll off the truck which is then removed. The support is then turned as may be necessary to locate the running roll in the "normal" position as shown in Figure 1, thereby insuring that the commutator is in the correct position to engage its co-acting brushes and complete the circuits for automatic operation. This proper positioning is insured by the switch 95, which acts to give a signal when the roll support is "off position".

As each new web roll is loaded into the support, web binder straps will be pasted on the end of the web, as shown in Figure 2 and the projecting portions of the binder straps brought out and anchored on the web binder anchors. The latches 243 (Figure 36) are then tripped to lock the anchors to the spindles supporting the web roll, and the anchors are thus rigidly held so they will rotate with the roll. A suitable adhesive is then applied along the outside of the binder straps, except within the areas which are engaged by the belts 56 and 56'.

Assuming that the web roll support contains two full sized rolls as indicated in Figure 5 the web will be fed from the roll in the uppermost position until it is reduced to a predetermined diameter. At this time there must be sufficient paper on the roll to allow time to permit turning the support through 180° to bring a replacement roll in position before the web of the old roll is exhausted. This condition is shown in Figure 6 and at that time the follower finger 23 will have reached a position where it operates the switch 102 to start the rotation of the arms and simultaneously will give a signal, which may be audible or visible, as desired, indicating that the automatic mechanism is about to make a roll replacement. As the arms are turned one of the cams 99 operates the switch 97 thereby energizing the motor 37 to lower the web deflector. Immediately this starts downward the switch 53 is closed and this energizes the winding of the brake magnet 293 which releases the brake on the sheave 287 thus disconnecting the shaft 58 from its drive and allowing the belts 56 and 56' to stop.

Further rotation of the arms 11 and 11' brings the rolls into the position shown in Figure 7, where the replacement roll is just entering into engagement with the then stationary belts. Further rotation effects engagement of one of the cams 101 to operate the switch 98 which energizes the solenoid 296 and immediately thereafter the brake magnet 293 is de-energized and the brake is gradually applied to the sheave 287, gradual application being effected by means of the dashpot as previously explained.

The application of the brake results in starting and accelerating the speed of the shaft 58 until the belts 56 and 56', and the periphery of the replacement roll, are running at the speed of the web that is being fed to the machine.

Further rotation brings the roll support to the position shown in Figure 8 and the position of the follower finger that is in contact with the replacement roll, so positions the cam 79 which operates the switch 83, that the motor effecting the rotation of the support is stopped when the periphery of the replacement roll is at the correct distance from the web running to the machine. Meanwhile, the web deflector has been brought to the position shown in Figure 8 and the motor which drives same has been stopped by the high part of the cam 52 coming into engagement with the switch 54. The arms remain in this position until the running roll has been exhausted to the desired diameter, as shown in Figure 9, when the follower finger that is in contact with it will effect the operation of the switch 103' that closes a circuit which includes the timer of the replacement roll, details of which are shown in Figure 45. When the rotation of the roll closes the circuit through the timer contacts, the pasted area on the end of the web of the replacement roll will have passed a position where it is adjacent to the running web, and a circuit being completed to the relay controlling the release magnet 48, the latter is de-energized releasing the armature 46 and allowing the web deflector to press the running web against the surface of the replacement roll. The rotation of the roll carries the binder anchor to the position shown in Figure 1 where it strikes the trip plate 322 thereby operating the switch 329 and cutting the running web as shown in Figure 10.

The web feed is thus transferred to the replacement roll as shown in Figure 11 and the web deflector is moved back to inoperative position, and at this time, the magnet 293 is energized releasing the brake on the driving differential and allowing the belts to be driven by the roll.

When the belts are thus driven, their inertia plus that of the pulleys and other parts thereby kept in motion, produces a stabilizing force which tends to maintain a constant peripheral speed of the web roll, even though the turning force may vary due to the roll not being a true cylinder.

The power required to drive these parts imposes a drag on the roll that produces a limited degree of tension on the web, but the main tension, is supplied by the tension device 15 the action of which results in gradually diminishing the braking force on the roll as its diameter is reduced.

During the running of the roll if the speed of the machine is either accelerated or decelerated, the magnet 293 is de-energized thereby applying the brake and effecting a driving connection to the driving belts which thereby act to drive the roll in synchronism with the speed of the machine, thus in the case of an increase in speed the belts assist in accelerating the roll to a higher speed, and in a case of a decrease in the speed in the machine, the belts act to check the momentum of the roll and prevent forming slack in the web due to the roll over-running. This synchronizing action is particularly beneficial when the machine is being started from rest.

The electric circuits of the mechanism herein disclosed, are shown in Figures 59 and 59A and are preferably connected with the circuits of the controller for the motor that drives the machine to which the web is fed. They are so arranged that when the machine is either accelerated or decelerated the brake magnet 293 is de-energized, the belts acting to control the roll at those times.

The circuits shown in the diagram are arranged to operate the brake magnet, the trip magnet, and certain of the magnet switches from a direct current circuit, certain other switches and the motors being shown operated from an alternating current circuit, as this is the preferred arrangement where both kinds of current are available. It is obvious, however, that the mechanism can be arranged to operate on either alternating or direct current alone.

There are three groups of commutator segments indicated generally with the numeral 146 in Figure 29. These three groups each consist of four segments, and for clearness, each group is shown separate on the diagram, but it will be understood that they are all carried on the shaft of the roll support and rotate with it. It will also be understood that in Figure 28, only two segments of each of the three groups are indicated, although in all there are a total of 12 segments, four in each of the three groups. While but six leads 148 are shown connected to the segments in Figure 28, it will be understood that other leads are back of those shown to a total of twelve, one for each segment. The segments of one group are marked X1, X2, X3 and X4; those of another group Y1, Y2, Y3, Y4; and those of the other group Z1, Z2, Z3 and Z4. These commutators form selector switches which alternately connect control circuits to the switches that operate in connection with a web roll carried on one end of the support, or to the switches which operate in connection with a roll carried on the other end of the support, the transfer being made automatically while the roll support is rotated to move the rolls successively into running position. Thus, certain circuits are completed through the switches 102 and 103 when the roll support is in position for feeding the web from one roll, and these circuits are completed through switches 102' and 103' when the support is turned 180° to bring the succeeding roll in web feeding position.

In the diagram, the roll support is shown with a running roll 28 that has been exhausted to the point where a web join is about to be made and a replacement roll 29 has been accelerated to the speed of the running web; all of the parts being on the same relative positions as in Figure 9.

In order to reach this position the motor 22 must previously have been energized to rotate the support and stopped, when it reached the proper position, by one of the control switches. This action may be understood by assuming that the roll 29 is reduced in diameter to a dimension wherein the follower 23 will act to close the contacts of the switch 102 thus energizing a circuit which may be traced as follows: From line A. C. 2 through conductors 351, 352 and 350 to contacts 353 of lockout relay L, which are then closed, through conductors 354 and 355 to contacts 356, which are then closed, then through conductors 357 and 358, to the brush engaging segment X2 of the commutator which acts as a selector for the circuits controlling the rotation of the roll support. From the segment X2, which rotates with the roll support, the circuit extends through conductor 359, through the switch 102, which is then closed, and thence through conductor 361 to segment X1 and from the brush engaging it through conductors 362 and 363 to the coil of switch F, which thus being energized, acts to close the circuit of the motor 22, to start rotation of the roll support. When the relay F is energized, it closes a maintaining circuit for its coil which may be traced from line A. C. 2 as previously described to conductor 357, and thence through conductor 358' and contacts 360, to the coil of relay F. This path, it will be understood, maintains a circuit to the relay coil after the brushes have moved off of the segments X1 and X2. Motor 22 as shown in the diagram is a polyphase alternating current motor fed from a three-wire line, the connections being arranged as follows: From line A. C. 3, conductor 364 extends through to the motor 22. From line A. C. 2, conductor 351 connects with one of the contacts 365, which are then closed, and the circuit extends from there by conductors 366 and 367 to the motor. Similarly, from line A. C. 1 the circuit is through conductor 368, contacts 369 and conductors 371 and 372 to the motor. The motor thus being energized the roll support will be rotated clockwise to bring the running roll into the lower position, where it is indicated at 28 in the diagram. This operation represents the movement from Figure 6 to Figure 8 of the drawings, the rotation of the support being stopped by the operation of the switch 83 by the cam 79. Closing this switch energizes the stop relay S, the circuit of which may be traced as follows: From line A. C. 2 through conductors 351, 352, and 373 to switch 83, the contacts of which are closed, then to contacts of switch 95, also closed, through conductor 374 to the coil of stop relay S, then through conductors 375 to 364 to line A. C. 3.

The stop relay S thus being energized the contact bridges carried thereby are moved to the position shown in the diagram, opening the circuit on the contacts 356 which are in circuit with the switch F, as previously described.

The switch F being de-energized the circuit of the motor 22 is thus interrupted and the support is stopped with the periphery of the replacement roll at a predetermined distance from the web of the running roll. The motor 22 is preferably arranged with a self-contained magnetic brake which acts to stop the motor quickly when the circuit through same is interrupted.

During the operation of rotating the support from the position shown in Figure 6 to that shown in Figure 9 the web deflector arm is moved downward to engage the web and the mechanism controlling the belts acts to first decelerate, and then to accelerate them. When the roll support is turned through an arc of perhaps 20°, one of the cams 99 operates to close the contacts of the switch 97 completing a circuit which energizes the switch D, effecting the downward motion of the deflector. The web deflector shaft 35 as shown in Figures 3 and 4 carries a cam 52, the high spot of which acts to stop the motion of the deflector in both directions. When the deflector is down the high spot engages the switch 54 and when it is up it engages the switch 53. The low spot on the cam engages the switch 55 when the deflector is down. The circuit for moving the web deflector down may be traced from line A. C. 2 through conductor 351 to the safe switch G, by conductor 376 through the contacts of switch H, by conductor 377 to and through switch K, by conductors 378 and 379 to and through switch 97, by conductor 381 to the winding of the switch D, then through conductor 382 to and through the contacts of switch 54, which are then closed, and by conductors 383, 384 and 385 to A. C. 3.

The switch D thus being energized acts to connect the motor 37 to its source of current, through circuits that may be traced as follows: From line A. C. 3 through conductors 385 and 386 to motor 37; from line A. C. 2 through conductor 387 to contacts 388 of switch D, which are then closed, then through conductor 389 to motor 37. Also from line A. C. 1 through conductor 391 to contacts 392 of switch D, which are also closed, and by conductor 393 to motor 37.

When the switch D closes a maintaining circuit is established which keeps it closed after the cam 99 has moved beyond the switch 97, the circuit being traced as follows: From line A. C. 2 through conductors 351, 352, 350 to and through contacts 353, through conductors 354 and 394 to and through contacts 395 of switch D, which are then closed and conductor 396, thus completing the circuit of the coil D, independent of the contacts of the switch 97. The motor 37 being energized the web deflector arm 34 is swung downward toward the position shown in the diagram. When the downward motion of the web deflector is completed the switch 54 is operated to open the contacts as shown in the diagram, thereby opening the circuit of the coil D and stopping the motor.

The initial downward motion of the deflector arm moves the high spot of the cam 52 away from the switch 53, the contacts of which are then closed, as shown in the diagram and two circuits are completed, one of which causes the brake magnet M to operate, and the other energizes the trip magnet 48. The circuit to the relay B1, which in turn energizes the magnet M may be traced as follows: From line A. C. 2 through conductors 351 and 352 to the coil of the belt decelerating relay B1, thence by conductors 397 and 398 to the contacts of the switch 53, thence through conductors 384 and 385 to line A. C. 3.

The relay B1 is thus energized and completes the circuit to the magnet M as follows: From line D. C. 5 through conductors 401 and 402 to and through contacts 403 of dashpot solenoid relay P1, which are then closed, through conductors 404 to contacts 405 of belt decelerating relay B1, which were closed by operation of the switch 53 as described, then by conductors 406 and 407 to the contacts 408 of the belt accelerating relay B2, which are then closed, then by conductors 409 to the winding of the brake magnet M, then by conductors 411, 412 and 413 to line D. C. 4.

The brake magnet thus being energized the roll control belts are disconnected from their driving mechanism before the replacement roll is moved into engagement with them. The circuit to the coil of the trip magnet 48 is also completed by the operation of the relay B1 when the switch 53 is closed on the initial downward movement of the web deflector. This circuit may be traced from D. C. 5 through conductors 401 and 414, contact 415, conductor 416, contacts 429, which are closed, conductor 431 to and through the resistance R1, conductor 432, to winding of the trip magnet 48 from the other side of which the circuit extends through conductor 433 to and through the resistance R2, and then by conductors 434, 435, 436, 412, and 413 to D. C. 4. The trip magnet 48 thus being energized the armature 46 will act to arrest the motion of the web deflector arm when the arm 49 engages with the armature 46, and the spring 45 will thereafter be compressed by the final downward motion of the rod 42.

Continued rotation of the web support brings the replacement roll into engagement with the roll control belts and the brake magnet is de-energized thus connecting the driving belts to their source of power. This is accomplished by the operation of the cam 101 engaging with the switch 98, the contacts of which are thus closed, and a circuit completed to the dashpot solenoid winding P and the dashpot solenoid relay winding P1, which acts to maintain the circuit through the solenoid P. The circuit for the solenoid winding P may be traced as follows: From line D. C. 5 through conductors 401 and 414, to and through contacts 415 of the relay B1, which are then closed, thence by conductors 416, and 417, through the switch 98 by conductor 418 to the dashpot solenoid winding P and from the other side of the winding to and through conductor 419 and 413 to line D. C. 4. This acts to straighten the toggle and make the dashpot retard the action of the armature of the brake magnet. The circuit for the relay P1, which is also energized by the closing of the switch 98, may be traced as follows: From line D. C. 5 through conductor 401 and 414 to and through contacts 415, through conductors 416 and 417 to switch 98 through conductors 418 and 421 to and through winding P1 and then through conductors 442 and 413 to D. C. 4.

The relay P1 thus being energized the contacts 423 are closed completing a circuit from D. C. 5 through conductors 401 and 402 to contacts 423, through conductor 424, to contacts 425 of the web deflector switch U, which are then closed, the circuit continuing through conductor 418 to the winding P and through conductor 421 to the winding P1, a maintaining circuit being thus established, which will keep these coils energized after the switch 98 has been opened by the continued rotation of the roll support. The action of the solenoid P closes the contacts 426 which energizes the relay B2, which in turn, de-energizes the magnet M, releasing the armature and causing the gradual application of the brake under the control of the dashpot. This action results in accelerating the belts.

This circuit for the relay B2 may be traced from the line D. C. 5 through conductors 401 and 427 to and through the winding of the relay B2, then through conductor 428, contacts 426, conductors 419 and 413 to line D. C. 4. The gradual acceleration of the roll control belts acts to accelerate the replacement roll to web speed and the mechanism is then in a position for the web joining operation when the running roll approaches exhaustion; this condition being shown in Figure 9 and in the diagram.

When the diameter of the roll 28 has decreased to a predetermined dimension the follower 23' acts to close the contacts of the switch 103', which are in circuit with the relay that operates the trip coil 48. The contacts of the timer driven by the replacement roll are also in this circuit. These as shown in Figure 45 and also in the diagram comprise brushes 178 and 179 and a segment 165 that is supported to rotate with the binder anchor 27 and so arranged that the circuit is completed when the binder anchor has carried the pasted portion of the web beyond the point where the periphery of the replacement roll is adjacent to the running web. The diagram shows the segment approaching this position.

It will be understood that a duplicate of the timer segment 165 and its coacting brush mechanism is used on the opposite end of the crosshead, these parts being indicated with the numerals 165', 178', and 179' in the diagram.

Assuming that the contacts of the switch 103' are closed when the segment 165 reaches the brush 179, the circuit for releasing the web deflector arm and thus pressing the running web against the replacement roll will be made. This circuit may be traced from line D. C. 5 through conductors 401 and 436', contacts 437, conductor 438, contacts 439, conductor 441, winding of the deflector trip switch D1, conductor 442 through the brush and contact segment Z2, conductor 443, brush 179, segment 165, brush 178, conductor 444, switch 103', conductor 445, segment Z1, through the brush in contact therewith and conductor 446 to the contacts of the switch 55 then closed, through conductors 447, 435, 436, 412, and 413 to D. C. 4, thus energizing the winding of the switch D1, which interrupts the current through the trip coil by opening the contacts 429 and momentarily reversing the circuit through the trip coil 48, effecting the quick release of the arm and allowing the web deflector to press the running web against the replacement roll.

The reverse circuit of the trip magnet may be traced from D. C. 5 through conductors 401, 414, contacts 415, conductor 416, contacts 448 then closed, conductors 449, 433, brake magnet winding 48, through which the current now passes in the opposite direction, conductor 451, to contacts 452 closed, then by conductors 453, 436, 412 and 413 to D. C. 4. It will be seen that when the winding of the relay D1 is energized, it thus interrupts the circuit through the magnet 48 and the resistances R1 and R2, and make a new circuit to the winding 48 by which it is energized in the reverse direction, this circuit being immediately broken when the winding of the relay D1 is de-energized by its circuit being interrupted at the brush 178. The arm 46 thus being released, allows the web deflector to press the running web against the replacement roll, this action being so timed as heretofore described, that the binder anchor head 201 will have passed the web deflector to an extent approximately as great as that shown in the diagram.

Continued rotation of the replacement roll brings the head 201 into contact with the web deflector support, releasing the clutch members which connect the heads to the spindles carrying the replacement roll, and simultaneously operating the knives to sever the binder straps, thus freeing the end of the web of the replacement roll and allowing it to adhere to the running web. At the same time, one of the trip plates 322 is struck by one of the heads 201 and the switch 329 is operated to close a circuit through one of the web severing solenoids and simultaneously, a circuit is made to return the web deflector to its inoperative position.

The circuit of the web severing mechanism may be traced from D. C. 5 through conductor 401 to the brush engaging commutator segment Y2, then through conductor 454 to one of the web severing solenoids 123, then through conductor 455, to commutator segment Y1, to the brush in contact therewith, and then through conductor 456, through the contacts of switch 329 closed, returning by conductor 457 and 413 to line D. C. 4. The web severing solenoid 123 thus being energized, it will operate to sever the running web immediately after the web join has been made.

The circuit for raising the deflector is made through deflector control relay U1, which in turn operates the deflector switch U, this circuit being as follows: From D. C. 5, through conductor 401 to the winding U1, then by conductors 458 and 456 to the contact switch 329 closed, through conductors 457 and 413 to line D. C. 4. This results in closing the contacts of relay U1 and thus energizes the switch U through a circuit which may be traced as follows: Line A. C. 2, conductors 351, 352, and 373 to the contacts 459, conductor 461 to the winding of the switch U, thence by conductors 462 and 398, contacts of switch 53 closed, conductors 384 and 385 to line A. C. 3. A contact of but short duration energizes the winding U1 and a maintaining circuit for the winding U parallels the contacts 459 and may be traced as follows: From line A. C. 2, conductor 387, through the contact plate which bridges the triple contacts 463 to the winding of the switch U, the circuit to which is thus maintained after the relay U1 is de-energized by the head 201 falling away from the deflector support.

The circuit for the motor which operates to raise the deflector arm is thus completed by the operation of the switch U, and may be traced from A. C. 3 to and through conductors 385 and 386 direct to one terminal of the motor 37. Also from line A. C. 2, through conductor 387, contacts 463 and conductor 464 to another terminal of the motor 37. Also from line A. C. 1, through conductor 391, switch contacts 465 closed, conductor 393 and to the third terminal of the motor. The motor thus being energized, the crank 41 is rotated to raise the web deflector towards its inoperative position.

The initial backward motion of the web deflector rotates the cam 52 and acts to open the contacts of the switch 55 and close the contacts of the switch 54. Opening the contacts of 55 results in opening the circuit to the relay coil D1. When the deflector has completed its movement, the cam acts to open the switch 53, thus interrupting the circuit through the switch U and also the relay B1, the winding of the switch U thus opening the circuit to the motor 37, when the crank 41 has reached its upper dead center position.

The brake magnet M is energized to disconnect the roll control belts from their driving mechanism when the web join is made, this action being accomplished as follows: When the coil of the switch U is energized as hereinbefore described to start the motor 37, the circuit through the contacts 425 is broken, thus disconnecting the solenoids P and P1 which are in parallel, from the line D. C. 5, these circuits having been hereinbefore described. The contacts 466 are simultaneously closed and partially complete a circuit for the brake magnet M, the circuit being fully completed by de-energizing the relay B2, the circuit to which is interrupted when the coil of the solenoid P is de-energized and opens the circuit at the contacts 426. Briefly stated, when the switch U operates to start the motor and raise the deflector arm, the dashpot solenoid P and the dashpot solenoid relay P1 will first be de-energized and the belt accelerating relay B2 is de-energized immediately thereafter.

This completes the circuit through the brake magnet M which may be traced from line D. C. 5 by conductor 467, contacts 466, conductors 468 and 469, through normally closed contacts 471 and 472, conductors 473 and 407, contacts 408 closed, and conductor 409 to the brake magnet winding, the opposite side of which is connected to line D. C. 4, as previously described. The brake circuit is thus energized during the time the motor is running to turn the web deflector to normal position. When it reaches the end of its travel and the switch 53 is opened, the circuit to the belt decelerating relay B1 is opened and contacts 474 are closed, and simultaneously the contacts 466 on the switch U which are in a parallel circuit will be opened. The closing of the contacts 474, however, maintains the current on the brake magnet M through the circuit from D. C. 5, through conductor 401, contacts 474, conductor 475, and conductor 469, as previously described.

The parts are now in a position for normal operation, the roll control belts being disconnected from the machine and being driven by the rotation of the roll.

It will be understood that electric controllers used for the operation of printing machinery and similar devices of this nature are ordinarily arranged for push button operation, the control being by means of three push buttons, an "on" button that is used for starting and acceleration, an "off" button that is used for deceleration and for stopping under normal conditions, and a "stop" button which is employed for stopping the machine quickly under emergency conditions. A portion of a controller of this type is shown in the diagram and indicated generally with the numeral 476. Two of the relays of such a controller are indicated at 477 and 478. These relays form no part of the invention and they are illustrated merely to explain the interconnection between the machine controller and the control circuits of the web supply mechanism.

The relay 477 can be assumed to be in the circuit of the "on" push button of the controller and the relay 478 in the circuit of the "off" and "stop" buttons, from which it will be understood that when the machine is started, stopped, accelerated or decelerated, one of these relays will be energized, and unless the web supply mechanism is functioning to make a web join, the circuit through the brake magnet M will be de-energized and the roll control belts driven, thus positively controlling the roll and accelerating it or decelerating it as the case may be, in synchronism with the speed of the machine, but when a web join is being made, the belts are controlled by the several switches and relays which function in response to the closing of the switch 97 which occurs soon after the roll support starts to turn.

The signal which gives warning of the making of a web join is indicated at S1 and may be a bell, a light, or any desired signaling device. It is so connected that the signal is given simultaneously with the starting of the motor when it rotates the support to automatically make a web join. Its circuit may be traced from line A. C. 2, through the "safe" switch G, conductor 376, contacts of push button H, conductor 377, contacts of push button K, conductors 378 and 479, contacts 481 and conductor 482, to the signal S1, the opposite side of which is connected to the line A. C. 3.

Another signal which indicates the instant at which the web join is made is indicated at S2 and is connected in parallel with the winding of the relay D1, from which it will be understood that this signal is given when the web deflector presses a running web against the replacement roll.

The push button station 331 provides means for turning the roll support under manual control for the purpose of loading web rolls therein. The two-way "safe" switch G in the position shown in the diagram, is set for automatic operation and feeds the circuits hereinbefore described. When it is moved to its "safe" position, the control is transferred to the push buttons H and K which are used for manual operation, the push button H providing means for turning the roll support clockwise while it is pressed in, and similarly by holding the switch K pressed in, the support can be rotated counterclockwise, thus allowing the spindles to be aligned with the cores of the web rolls, as hereinbefore mentioned. Assuming the switch G is moved into engagement with the contact 483, a circuit is made from line A. C. 2, conductor 351, to the switch G, thence to contact 483. If the push button is pressed, the circuit will be closed through contacts 484, through conductors 485 and 363 to the forward switch F which is thus energized.

Similarly for reverse operation the circuit extends through the contacts of the push button K then closed, to contacts 486 and conductor 487 to the winding of the motor reversing switch R, and from the opposite side of the winding to conductor 375 and 364 to A. C. 3. The switch R thus being energized, the circuits of the motor 22 are completed from A. C. 2, through conductors 351, 352 and 488, to contacts 489 closed, and conductors 491 and 372 to the motor 22. Also from A. C. 1, through conductor 368 and 492 to contacts 493 closed, and conductors 494 and 367 to the motor 22, the third lead of the motor being connected, as previously described. The connections are thus made to operate the motor in a reverse direction from normal operation.

The switches 95 and 83 in combination provide means for giving a signal in case the roll support is not returned to the proper position for automatic operation after it has been moved by means of the push buttons, as in the case of loading rolls, and also to prevent the functioning of the web deflector if the support is "off" position. This result is accomplished by the arrangement of switches 83 and 95, whereby the cam 79 acts on the roller 81 to close the contacts of the switch 83, and further movement of the roller will open the contacts of the switch 95, thus in turning the support clockwise, if it is stopped before it reaches the proper position, switch 83 will not be closed, but if it is moved beyond the proper position, switch 95 will be opened, from which it will be seen that the support must be in the correct position to insure both of these switches being closed, and the circuit to the relay S completed, it being necessary to have this switch S energized in order that the web deflector mechanism may function.

Circuit to a signal S3, which may be of any desired kind, is completed when the contacts 495 of the switch S are closed, the signal circuit being from A. C. 2 through conductors 351, 352, and 496, to the signal S3 and then to contacts 495 and through conductors 497, 375 and 364 to A. C. 3. A warning signal is thus produced if the roll support is off the proper position for automatic operation.

It will be understood that connections 498 and 499 which extend from the segments X3 and X4 to the switch 102', are inactive with the roll support in the position shown in the diagram, but that they become active when it is turned through 180°. Similarly, the segments Y3 and Y4 will then be connected to the conductors 401 and 456 to energize the cutting solenoid connected to them, and the segments Z3 and Z4 will be connected to the switch 103, and to the timer segment 165' through the leads 501 and 502, their circuit being completed through the conductor 503.

It will be observed that the web severing mechanism acts immediately after the web of the replacement roll is joined to the web running from the exhausting web roll, the time interval being only that required for the operation of the solenoid 123, hence the old web is severed at a point which in every case is substantially the same distance from the point where the webs are joined, and no excessive "tail" from the old web is formed when the operation is made while running at high speed.

The term "peripheral follower" is used herein to mean a member engaging a web roll by contact with the surface of the roll or the belt thereon and following said surface radially as the roll unwinds so that its position is determined by the diameter of the paper roll.

The foregoing description shows the preferred embodiment of the invention in which the roll support is adapted to carry but two web rolls, but it will be understood that the invention can readily be applied to roll supports adapted to carry a greater number of rolls. Other adaptations of the invention will be apparent to those versed in the art, hence its scope should be limited only by the claims hereinafter made.

What we claim is:

1. In a web supply mechanism, a rotatable web roll support provided with rotating mechanism and adapted to carry a running roll and a replacement roll, and control means for said mechanism mounted on said support, including a follower adapted to contact with the periphery of a running roll and start the rotation of the support when the running roll is of a predetermined reduced diameter, and other means including another follower also mounted on the support and contacting with the periphery of the replacement roll and adapted to stop the support when the replacement roll is in a desired position.

2. In a web supply mechanism, a rotatable web roll support provided with rotating mechanism and adapted to rotatably support a running roll and a replacement roll, a follower mounted thereon and adapted to move in contact with the surface of the running roll and to start the rotation of the support when the running roll has reached a predetermined diameter, and a follower means mounted on said support and contacting with the surface of the replacement roll and adapted to stop the support when the replacement roll is in desired position adjacent the running web of the running roll.

3. In a web supply mechanism, a web roll support, rotating mechanism therefor, means on said support adapted to rotatably support a running roll and a replacement roll, a follower pivotally mounted on said support in contact with the surface of said running roll and adapted to control said rotating mechanism, means for rendering said control mechanism operative by a predetermined reduced diameter of the running roll to start the rotation of said reel, and a second follower contacting the periphery of the replacement roll and mounted on said support, and adapted to stop its rotation when the replacement roll is revolved to a position adjacent the running web.

4. In a web supply mechanism, a rotatable support for a running web roll and a replacement roll, electrically operated means for rotating the support, a web deflector adapted to press a web from the running roll against the periphery of the replacement roll, electrically operated means for actuating the deflector, a follower pivotally mounted on the support and bearing on the periphery of a web roll, and switches connected to the follower adapted to effect respectively rotation of the support and operation of the electrically operated means to actuate the deflector.

5. In a web supply mechanism, a support for a running web roll and a replacement roll, actuating means operated automatically when the running roll is partially exhausted for rotating the roll support to move the replacement roll into position for making a web join, means including a follower mounted on the support for stopping the support automatically when the periphery of the replacement roll reaches a position near the web running from the running roll, and a brush arranged to press the running web against the replacement roll in running position to make the join.

6. In a web supply mechanism, a support for a running web roll and a replacement roll having adhesive on its outer web end, actuating means operated automatically when the running roll is partially exhausted for rotating the roll support to move the running roll away from running position and to move the replacement roll into position for running and for making a web join, means including a follower mounted on the support for stopping the support automatically when the periphery of the replacement roll reaches a position near the web running from the running roll, and means for pressing the running web against the replacement roll in running position to make the join.

7. In a web supply mechanism, a support for a running web roll and a replacement roll having adhesive on its outer web end and a binder securing the web end to the surface of the said replacement roll, means for accelerating the replacement roll to a peripheral speed substantially equal to that of the running web preparatory to making a web join, a web deflector adapted to press the running web against the replacement roll to make the join, means for severing the web of the running roll, and means to sever the binder and to actuate the web severing means.

8. In a web supply mechanism, a support for a running web roll and a replacement roll having adhesive on its outer web end and a binder securing the web end to the surface of the said replacement roll, means for accelerating the replacement roll to a peripheral speed substantially equal to that of the running web preparatory to making a web join, means to press the running web against the replacement roll to make the join, means for severing the web of the running roll, and means acting simultaneously to sever the binder and to actuate the web severing means.

9. In a web supply mechanism, a support for a running web roll and a replacement roll having adhesive on its outer web end and a binder securing the web end to the surface of the said replacement roll, means for accelerating the replacement roll to a peripheral speed substantially equal to that of the running web preparatory to making a web join, a web deflector arranged to press the running web against the replacement roll to make the join, means for severing the binder, a timer moving in synchronism with the replacement roll, and means actuated by the timer to control the operation of the web deflector and the severing means.

10. In a web supply mechanism, a support for a running web roll and a replacement roll having adhesive on its outer web end and a binder securing the web end to the surface of the said replacement roll, means for accelerating the replacement roll to a peripheral speed substantially equal to that of the running web preparatory to making a web join, a web deflector arranged to press the running web against the replacement roll to make the join, means for severing the binder, actuating means operated automatically when the running roll approaches exhaustion and adapted to control the operation of the said deflector, and a timer moving in synchronism with the replacement roll and adapted to cooperate with the said actuating means to control the operation of the web deflector and the severing means.

11. In a web supply mechanism, a support for a running web roll and a replacement roll having adhesive on its outer web end, a binder anchor rotating with the replacement roll, a binder fastened to the anchor and securing the web end to the surface of said replacement roll, means for accelerating the replacement roll to a peripheral speed substantially equal to that of the running web, web shifting means for moving the web from the running roll against the replacement roll, and means for severing the binder.

12. In a web supply mechanism, a support for a running web roll and a replacement roll, means for operating the roll support to move an exhausted running roll away from running position and move a replacement roll to normal running position preparatory to making a web join, web shifting means for moving the running web against the replacement roll when in normal running position to make the join, a plurality of severing means on the support, a commutator for selectively rendering said severing means operable to sever the web of the exhausted running roll when the join is made, and means for moving said roll from said normal running position when the roll is nearly exhausted.

13. In a web supply mechanism, a support for a running web roll and a replacement roll having adhesive on its outer web end, a binder anchor rotating with the replacement roll, a binder fastened to the anchor and securing the web end to the surface of said replacement roll, a first actuating means operated automatically when the running roll is partially exhausted for operating the roll support to move the running roll away from running position and move the replacement roll to running position preparatory to making a web join, means for accelerating the replacement roll to a peripheral speed substantially equal to that of the running roll, means for pressing the running web against the replacement roll in running position to make the join, means for severing the binder, and means on the support for severing the web of the exhausted running roll when the join is made.

14. In a web supply mechanism, a support for a running web roll and a replacement roll having adhesive on its outer web end, a first actuating means operated automatically when the running roll is partially exhausted, for operating the roll support to move the running roll away from running position and move the replacement roll to running position preparatory to making a web join, means for accelerating the replacement roll to a peripheral speed substantially equal to that of the running roll, means for pressing the running web against the replacement roll in running position to make the join, a second actuating means operated automatically when the running roll approaches exhaustion and adapted to control the operation of the said pressing means, a timer moving in synchronism with the replacement roll and adapted to cooperate with the said second actuating means to control the operation of the pressing means to make the join, and means on the support for severing the web of the exhausted running roll when the join is made.

15. In a web supply mechanism, means for supporting an expiring web roll and a replacement roll, means for joining the web of the replacement roll to the web of the expiring roll and means acting automatically to sever the expiring web when the join is made; said severing means including, a first arm and a second arm each, pivotally supported at one end and free at the other, a cutting member having one end pivoted to the free end of the first arm and the other end pivoted to the free end of the second arm, said second arm being spring biased to move the cutting member to an inoperative position, and electrically operated means acting on the first mentioned arm to move the cutting member to web severing position.

16. In a web supply mechanism, means for supporting an expiring web roll and a replacement roll, means for joining the web of the replacement roll to the web of the expiring roll and means acting automatically to sever the expiring web when the join is made; said severing means including a pair of arms one pivotally supported adjacent each edge of the web running from the expiring roll, a cutting element pivotally connected to each arm, a spring connected to one of the arms and arranged to hold the cutting element away from the web, and electrically operated means to force the cutting element against the web.

17. In a web supply mechanism, a support for a running web roll and a replacement roll, means for operating the roll support to move the running roll away from running position and the replacement roll into running position preparatory to making a web join, means for pressing the running web against the replacement roll in running position to make the join, a follower in engagement with the periphery of the running roll, a first control mechanism connected to the follower and adapted to actuate the operating means when the running roll reaches a predetermined diameter, and a second control mechanism connected to the follower and adapted to effect operation of the pressing means when the running roll approaches exhaustion.

18. In a web supply mechanism for holding web rolls of varying length, a rotatable support for a running web roll and a replacement roll, a motor for rotating the support, means actuated when the running roll is partially exhausted for starting the motor, and means mounted on the support and governed by the radial dimension of the replacement roll for stopping the motor when the replacement roll is moved close to the running web.

19. In a web supply mechanism, a rotatable support for a running web roll and a replacement roll, a motor for rotating the support, a follower bearing on the periphery of the running roll, a switch actuated by the follower when the said roll is partially exhausted for starting the motor, a second follower bearing on the periphery of the replacement roll, and a second switch actuated thereby for stopping the motor when the replacement roll is moved close to the running web.

20. In a web supply mechanism, a rotatable support for a running web roll and a replacement roll, a motor for rotating the support, and means on the support governed by the radial dimension of the replacement roll for actuating means for stopping the motor when the periphery of the replacement roll is a predetermined distance from the running web.

21. In a web supply mechanism, a rotatable support for a running web roll and a replacement roll, a motor for rotating the support to bring the periphery of the replacement roll near the running web, a web deflector adapted to press the running web against the surface of the replacement roll, followers pivotally mounted on the support and bearing on the peripheries of the rolls, and members connected to the followers, one member being adapted to stop the motor, another member being adapted to start the motor and actuate a signal device, and another member being adapted to control the operation of the deflector.

22. In a web supply mechanism, a rotatable support for a running web roll and a replacement roll, a motor for rotating the support to bring the periphery of the replacement roll near the running web, a web deflector adapted to press the running web against the surface of the replacement roll, means for starting and stopping the motor, means for controlling the operation of the web deflector, and a follower bearing on the periphery of a roll and movable to a first position to engage means for stopping the motor, to a second position to engage means for starting the motor, and to a third position to engage means for controlling the operation of the web deflector.

23. In a web supply mechanism, a rotatable support for a running web roll and a replacement roll, a motor for rotating the support to bring the periphery of the replacement roll near the running web, means for starting and stopping the motor, a web deflector adapted to press the running web against the surface of the replacement roll, means for controlling the operation of the deflector, two followers pivotally mounted on the support each bearing independently on the periphery of one of the rolls, each follower being positioned by the radial dimension of a roll, to a first position for engaging means for stopping the motor, and positioned by changing dimension of the roll as it unwinds, to a second position for engaging means for starting the motor, and to a third position for engaging means to control the operation of the web deflector.

24. In a web supply mechanism for a printing machine, a web deflector adapted to press a running web against the replacement roll, a support for the deflector swingable on a pivot fixed relatively to the machine, and means for moving the deflector into and out of operative position; said means including a motor geared to a crank yieldingly connected to the deflector support.

25. In a web supply mechanism for a printing machine, a web deflector adapted to press a running web against the replacement roll, a support for the deflector swingable on a pivot fixed relatively to the machine, a motor geared to a crank, a connecting rod between the crank and the deflector support, and a spring on the rod to press the deflector against the web.

26. In a web supply mechanism, means for controlling the rotation of a web roll including a belt supported on pulleys and held in close engagement with the periphery of the roll, the said belt being normally driven by the roll, means for driving one of the pulleys to accelerate the roll, and to drive the roll while the speed of the machine is being changed.

27. In a web supply mechanism, means for controlling the rotation of a web roll including a belt supported on pulleys and held in close engagement with the periphery of the roll, a resiliently supported idler pulley adapted to take up the belt as the roll decreases in size, a pivotally supported frame carrying the pulleys, and means for driving one of the pulleys to accelerate the roll and to drive the roll while the speed of the machine is being changed.

28. In a web supply mechanism, means for controlling the rotation of a web roll including a plurality of belts each supported on pulleys and held in close engagement with the periphery of the roll, and means for driving one of the pulleys around which each belt passes; said means including a differential gear mechanism allowing the speed of either belt to vary with respect to the speed of the other.

29. In a web supply mechanism, means for rotating and controlling a web roll including a belt supported on pulleys and held in engagement with the periphery of the roll, the said belt being normally driven by the roll, means for driving one of the pulleys including a differential gear mechanism having three rotating elements, one of which is connected to the pulley, another to the machine, and the other to a braking device normally acting quickly, and means to retard action of the braking device.

30. In a web supply mechanism, means for rotating and controlling a web roll including a belt supported on pulleys and held in engagement with the periphery of the roll, the said belt being normally driven by the roll, means for driving one of the pulleys including a differential gear mechanism having three rotating elements, one of which is connected to the pulley, another to the machine, and the other to a braking device, and means to selectively apply the brake either quickly or gradually to rotate the roll.

31. In a web supply mechanism, means for rotating and controlling a web roll including a belt supported on pulleys and held in engagement with the periphery of the roll, the said belt being normally driven by the roll, means for driving one of the pulleys including a differential gear mechanism having three rotating elements, one of which is connected to the pulley, another to the machine, and the other to a braking device, means to gradually apply the brake to accelerate the web roll, and means to quickly apply the brake to decelerate the roll.

32. In a web supply mechanism for a machine having a controller, a rotatable support for a plurality of web rolls, means for rotating the support to bring the rolls successively into running position, a belt for accelerating the rotation of a web roll and for controlling its deceleration, pulleys arranged to support the belt, a magnetically operated driving connection for one of said pulleys, and control means for said driving connection operated by the rotation of the support.

33. In a web supply mechanism for a machine having a controller, a rotatable support for a plurality of web rolls, means for rotating the support to bring the rolls successively into running position, a belt for accelerating the rotation of a web roll and for controlling its deceleration, pulleys arranged to support the belt, a magnetically operated driving connection for one of said pulleys, and control means for said driving connection operated by the rotation of the support and by a switch electrically connected with the controller.

34. In a web supply mechanism for a machine operating upon a web, a rotatable support for a web roll from which a web is running to the machine and for a replacement roll, a motor adapted to rotate the support, means for starting the motor when the running roll is partly exhausted, means for rotating the replacement roll and accelerating it to web speed, means governed by the radial dimension of the replacement roll for stopping the motor when the periphery of the replacement roll is in a predetermined relation to the running web, a binder secured to the outer web end of the replacement roll, a member rotating with the roll for holding the binder, a web deflector, means actuated when the running roll is substantially exhausted for moving the deflector to press the running web against the replacement roll, means for severing the binder, and means for severing the web from an exhausted roll.

35. In a web supply mechanism for a machine operating upon a web, a support for a web roll from which a web is running to the machine and for a replacement roll, a motor adapted to rotate the support, means for starting the motor when the running roll is partly exhausted, means for rotating the replacement roll at the speed of the running web, means governed by the radial dimension of the replacement roll for stopping the motor when the periphery of the replacement roll is in a predetermined relation to the running web, a binder secured to the outer web end of the replacement roll, a member rotating with the roll for holding the binder, a web deflector, means actuated when the running roll is substantially exhausted for moving the deflector to press the running web against the replacement roll, mechanism for severing the binder, means for severing the web from an exhausted web roll, and electromagnetic devices arranged to operate the several said means in the sequence in which they are named.

36. In a web supply mechanism for a machine operating upon a web, a support for a web roll from which a web is running to the machine and for a replacement roll, a motor adapted to rotate the support, means for starting the motor when the running roll is partly exhausted, means for rotating the replacement roll to accelerate it to web speed and for checking the rotation of the roll when the machine is decelerated rapidly, means governed by the radial dimension of the replacement roll for stopping the motor when the periphery of the replacement roll is in a predetermined relation to the running web, a binder secured to the outer web end of the replacement roll, a member rotating with the roll for holding the binder, a web deflector, means actuated when the running roll is substantially exhausted for moving the deflector to press the running web against the replacement roll, means for severing the binder, and means for severing the web from an exhausted roll.

37. In a web supply mechanism, an axially movable rotatable support for a running web roll and a replacement web roll, a control switch on the support, a commutator secured to the support and electrically connected to the control switch, a brush holder movable axially with the support but held against rotation, and brushes carried by the brush holder and engaging with the commutator.

38. In a web supply mechanism, an axially movable rotatable support for a running web roll and a replacement web roll, a control switch on the support, a commutator member and a brush holder member, one of which is secured to the support and the other of which is movable axially with the support but held against rotation, and brushes carried by the brush holder and engaging with the commutator; the said member that is secured to the support being electrically connected to the control switch.

39. In a web supply mechanism, a rotatable support for a running web roll and a replacement roll, a commutator secured to the support, an arm movable on the support to adapt it to receive rolls of different lengths, a control switch on the arm, an electric conductor connecting the switch and the commutator, and means to take up slack in the conductor when the arm is moved in one direction along the support, and to pay out slack when the arm is moved in the opposite direction.

40. In a web supply mechanism, spindles adapted to rotatably support a replacement web roll, clutch members rotatable on the spindles, means secured to the clutch members adapted to hold the web end of the replacement roll against its periphery, latches movable in one direction to permit the clutch members to engage the spindles and in another direction to disengage them when rotational motion of the clutch members is impeded.

41. In a web supply mechanism, spindles adapted to rotatably support a replacement web roll, clutch members rotatable on the spindles, web binder anchors secured to the clutch members and adapted to secure web binders for holding the web end of the replacement roll against its periphery, and means for severing the web binders and simultaneously releasing the clutches.

42. In a web supply mechanism, spindles adapted to rotatably support a replacement web roll, clutch members rotatable on the spindles, web binder anchors secured to the clutch members and adapted to secure web binders for holding the web end of the replacement roll against its periphery, latches movable to permit the clutch members to engage the spindles, and means for disconnecting the clutch members from the spindles when rotational motion of the web binder anchors is impeded.

43. In a web supply mechanism, a spindle adapted to rotatably support a replacement web roll having a normally free end confined by a binder, and means secured to said binder and frictionally engageable with said spindle, said means including a latch adapted to maintain said means disengaged from said spindle after rotational movement of the means has been checked.

44. In a web supply mechanism, a spindle adapted to rotatably support a web roll having an outer web end confined by a binder, and means for receiving and for severing said binder when desired, said means being secured to a friction clutch assembly mounted on said spindle, and a latch connected to the said clutch and operable to maintain the clutch and the means disengaged from the spindle after rotational movement of said means has been checked.

45. In a web supply mechanism, a spindle adapted to rotatably support a web roll, means for confining an outer web end of said roll, an anchorage member securable to said means and revolvably mounted on said spindle, and other means for fastening said anchorage member to the spindle but yieldable to release same when rotational movement of said anchorage member is checked.

46. In a web supply mechanism, a revolvable means adapted to support a web roll, a binder for securing an outer end of said web roll while rotating, and a web binder anchor secured to other means rotatably mounted on said first mentioned means but adapted to be secured to same for communicating rotation to the web binder anchor until the rotation of said web binder anchor is checked.

47. In a web supply mechanism, a spindle adapted to rotate a support for a replacement web roll, a clutch member rotatable on the spindle, a web binder anchor secured to the clutch member and adapted to secure a web binder holding the web end of the replacement roll against its periphery, and an electrical timing device operated by the rotation of the clutch member.

48. In a web supply mechanism, a spindle adapted to rotate a support for a replacement web roll, a clutch member rotatable on the spindle, a web binder anchor secured to the clutch member and adapted to secure a web binder holding the web end of the replacement roll against its periphery, an electrical timing device operated by the rotation of the clutch member, and means controlled by the timing device for severing the web binder.

49. In a web supply mechanism, a spindle adapted to rotate a support for a replacement web roll, a clutch member rotatable on the spindle, a web binder anchor secured to the clutch member and adapted to secure a web binder for holding the web end of the replacement roll against its periphery, an electrical timing device operated by the rotation of the clutch member, and means controlled by the timing device for effecting severance of the web binder and simultaneously releasing the clutch.

50. In a web supply mechanism, a rotatable support for a running web roll and a replacement web roll having a binder secured to the outer web end thereof, a binder anchor supported to rotate with the roll, a web deflector adapted to press the web from the running roll against the replacement roll, an electrically operated web severing mechanism, an electric switch in circuit with the web severing mechanism, and means connected to the web deflector to operate the switch when said means is engaged by the binder anchor.

51. In a web supply mechanism, a rotatable support for a running web roll and a replacement web roll, a belt adapted to accelerate the replacement roll to a peripheral speed substantially equal to that of the running web, a pivotally supported frame, pulleys rotatably supported in the frame and adapted to carry the belt, a take-up pulley to maintain the belt in contact with the periphery of the roll as the web is wound therefrom, and means actuated by rotation of the support to accelerate and decelerate the belt.

52. In a web supply mechanism, a rotatable support for a running web roll and a replacement web roll, a shaft, a pulley operably connected to the shaft, a belt on the pulley in running engagement with the replacement roll and normally driven thereby, means for driving the shaft including a magnetically operated device whereby the shaft is connected to a source of power, means for retarding the action of said magnetic device to gradually accelerate the shaft, and means to render said retarding device inoperative.

53. In a mechanism for supplying a web to a printing machine, a rotatable carrier adapted to receive full length or half length web rolls and having a first supporting means adapted to support a web roll from which the web is running to the machine and a second supporting means adapted to support a replacement web roll, an electric circuit controlling device associated with each of the said supporting means and adapted to be operated by the rotation of the corresponding roll and thereby to initiate a phase in the operation of web renewal, a selector switch operable by movement of the carrier and arranged selectively to render operative the controlling devices when the carrier is rotated, conductors completing circuits including the switch and said electrical controlling device, and a slack take-up device for said conductors to permit axial movement of the carrier for rolls of different lengths.

54. In a mechanism for supplying a web to a printing machine, a rotatable carrier adapted to receive either full length or half length web rolls and having a first supporting means adapted to support a web roll from which a web is running to the machine and a second supporting means adapted to support a replacement web roll, and means for joining the web of the replacement roll to the web of the running roll, including means for effecting rotation of the replacement roll at a peripheral speed corresponding to the speed of the running roll, an electric circuit controlling device associated with each of the said supporting means and having a contact member operated by rotation of the roll carried by the respective supporting means and adapted to initiate a phase of the operation of joining the webs at a time when the replacement roll is in a suitable angular position, a selector switch actuated by the rotation of the roll carrier and arranged to selectively render operative the said controlling devices when the carrier is rotated, conductors completing circuits including the switch and said electrical controlling device, and a slack take-up device for said conductors to permit axial movement of the carrier for rolls of different lengths.

55. In a web supply mechanism adapted to receive full length or half length web rolls, a rotatable web roll carrier adapted to rotatably support a running roll and a replacement roll, mechanism for rotating said carrier, means for starting said mechanism when the running roll is reduced to a predetermined diameter, and means on the said carrier including a follower contacting with the periphery of the replacement roll and following the roll in its reduction of diameter and adapted to actuate means for stopping the said mechanism.

56. In a web supply mechanism for holding web rolls of varying length, a rotatable web roll carrier adapted to rotatably support a running roll and a replacement roll, mechanism for rotating said carrier, means for starting said mechanism when the running roll is reduced to a predetermined diameter, and means on the said carrier including a follower contacting with the periphery of the replacement roll and following the roll in its reduction of diameter and adapted to actuate means for stopping the said mechanism.

57. In a web supply mechanism for a printing machine, a rotatable support adapted to hold a plurality of web rolls, a tension device for supplying braking force to govern the tension of a web being fed to the machine from one of the rolls, a belt and means for driving same, means for supporting said belt in continuous engagement with the roll to accelerate same to running speed and to supply additional braking power under emergency stop conditions.

58. In a web supply mechanism for a printing machine, a rotatable support adapted to hold a plurality of web rolls, a tension device for supplying braking force to govern the tension of a web being fed to the machine from one of the rolls, a belt and means for driving same, means for supporting said belt in continuous engagement with the roll to accelerate same to running speed and to supply additional braking power under emergency stop conditions, and means to disengage the drive to the belt to permit the belt to be driven by the roll under normal running conditions.

59. In a web supply mechanism, a support for a running web roll and a replacement roll, a member at the end of the replacement roll adapted to hold its web end in contact with the body of the replacement roll, means for producing relative movement between the replacement roll and running web to make a web join, and a timer movable by said member for controlling the operation of said means.

60. In a web supply mechanism, a support for a running web roll and a replacement roll, a member adapted to secure the web end of the replacement roll in contact with the body thereof, a web deflector for pressing the running web against the replacement roll to make a web join, and a timer mechanically connected to said member; the proper adjustment of the timer being effected by moving the member into position to secure the web end.

61. In a web supply mechanism, a rotatable shaft, a support for a running web roll and a replacement roll, said support being movable axially on the shaft to accommodate full length or half length web rolls, a web deflector adapted to press the running web against the replacement roll to make a web join, electrical means for actuating the deflector, a timer on the support and rotatable with the replacement roll and positionable angularly with respect to the end of the web for controlling the operation of the deflector, and conductors completing a circuit including the timer and the said electrical means; said conductors having a take-up mechanism to permit axial movement of the support on the shaft.

62. In a web supply mechanism, a rotatable shaft, a support for a running web roll and a replacement roll, said support being movable axially on the shaft to accommodate full length or half length web rolls, a web deflector adapted to press the running web against the replacement roll to make a web join, electrical means for actuating the deflector, a timer on the support and rotatable with the replacement roll and positioned angularly with respect to the end of the web for controlling the operation of the deflector, and conductors rotatable with the support and completing a circuit including the timer and the said electrical means; said conductors having a take-up mechanism to permit axial movement of the support on the shaft.

63. In a web supply mechanism, a rotatable web roll support adapted to rotatably carry a running roll and a replacement roll and move said replacement roll to a web joining position, control means for starting rotation of said support, and adjustable control means for stopping the support when the replacement roll reaches the said position; said adjustable control means being prepositioned by means responsive to the radial dimension of the replacement roll.

64. In a web supply mechanism, a rotatable web roll support operated by an electric motor and adapted to rotatably carry a running roll and a replacement roll and move said replacement roll to a web joining position, control means for starting said motor, and adjustable control means for stopping the motor when the replacement roll reaches the said position; said adjustable control means being prepositioned by means responsive to the radial dimension of the replacement roll.

65. A device of the class described comprising a rotatable roll stand shaft, a plurality of paper roll holding arms carried by said shaft, a plurality of control arms mounted on said shaft, there being one control arm for each pair of paper roll holding arms, spring means to urge the free ends of said control arms against paper rolls mounted between said holding arms, an electrical contact for each control arm, commutator means connected with the said contacts, brush means adapted to engage said commutator means when the corresponding control arm is in contact with a paper roll in position to feed paper at a feeding station, and a control circuit operatively connected with said brush means.

66. A device of the class described comprising a rotatable roll stand shaft, a plurality of paper roll holding arms carried by said shaft, a plurality of control arms mounted on said shaft, there being one control arm for each pair of paper roll holding arms, spring means to urge the free ends of said control arms against paper rolls mounted between said holding arms, an electrical contact for each control arm, an electrical circuit, and selector means to connect a predetermined control arm contact with said electric circuit.

67. A device of the class described comprising a rotatable roll stand shaft, a plurality of paper roll holding arms carried by said shaft, a plurality of control arms pivoted on said shaft, there being one control arm for each pair of paper roll holding arms, spring means to urge the free ends of said control arms against paper rolls mounted between said holding arms, a pair of electrical contacts for each control arm, commutator means connected with said contacts, brush means adapted to engage said commutator means when the corresponding control arm is in contact with a paper roll in position to feed paper at a feeding station, and a control circuit operatively connected with said brush means.

68. A device of the class described comprising a roll stand for a printing press having a central shaft and a plurality of pairs of paper roll holding arms carried by said shaft, in combination with a control arm for each pair of holding arms, pivot means mounted on said shaft for each control arm to position said arms in the path of a paper roll when the same is being set in place between a pair of holding arms, spring means to urge the free ends of the control arms against paper rolls mounted on said holding arms, and means operated by said control arms to close an electrical circuit when a paper roll in position at a feeding station reaches a predetermined size.

69. A device of the class described comprising a central roll stand shaft, a plurality of pairs of paper roll holding arms carried by said shaft, a control means for each pair of holding arms comprising a follower adapted to engage the periphery of the paper roll supported between the corresponding pair of holding arms and biased toward the axis of a paper roll supported by said pair of holding arms, said follower being mounted to extend into the path of movement of said paper roll when the same is being moved into position between the said holding arms whereby said paper roll moves said control means to an inactive position, and electric circuit closing means operated by one of said control means when the paper of a roll reaches a predetermined size.

70. A device of the class described comprising a central roll stand shaft, pairs of paper holding arms carried by said shaft and adapted to receive a roll of paper loaded therebetween by a movement into loading position transversely of said shaft, a control arm mounted on said shaft and having a portion extending into the path of movement of the paper roll into said loading position whereby said roll engages said control arm to move the same when said roll is being positioned between a pair of said holding arms, spring means to urge the control arm against said paper roll, and electrical contact means adapted to be closed by said control arm when the paper from the roll with which the arm is engaged has been exhausted to a predetermined limit.

71. A device of the class described comprising a roll stand shaft, pairs of paper holding arms carried by said shaft, each pair of arms being adapted to support a roll of paper and adapted to receive a roll of paper moved into place between said arms by a movement transversely of said shaft, control means mounted upon said shaft and positioned on said shaft and in the path of said roll when being moved into place between said arms whereby said roll engages said control means without interfering with the positioning of said roll between said arms moves said control means into inactive position, spring means to hold said control means in contact with said roll, and contact means rendered operative by said control means when the paper of said roll is exhausted to a predetermined limit.

72. A device of the class described comprising a paper roll support adapted to carry a paper roll, a control arm pivoted at one end and free at the other end and with the free end of the arm bearing against the surface of the paper on said paper roll, a weighted portion between the pivot and the free end of said arm to provide an inertia portion of said arm and the free end of said arm being of light weight in order to obviate inertia of the arm from causing the free end thereof to be thrown from the paper when the roll operates at a relatively high speed, spring means urging said free end of said arm against said paper roll, and contact means operated by said arm when the free end of said arm has been moved to a predetermined limit.

73. A device of the class described comprising a paper roll support adapted to carry a paper roll, a control arm carrier mounted on said support, a control arm pivoted at one end on said carrier and free at the other end with the free end of the arm bearing against the surface of the paper on said paper roll on said roll support, said arm being of light weight in order to obviate inertia of the arm causing the free end of said arm to be thrown from the paper when the roll rotates at a high speed, spring means urging said free end of said arm against said paper roll, and contact means operated by said arm when said arm has been moved to a predetermined limit.

74. In a web supply mechanism, a rotatable web roll support provided with rotating mechanism and adapted to carry a running web roll and a replacement roll, mechanism for pressing the web from said running web roll against the web of said replacement roll for making a web join, means mounted on said support adapted to control said mechanism and rendered operative by reduced diameter of a running roll to press said running web against the web of said replacement roll, said means comprising a peripheral follower movable transversely of the axis of rotation of said support, mounted on said support for engagement with a web roll, whereby the position of said follower relative to a web roll engaged thereby is unaltered by rotation of said support in a direction to move a replacement roll toward running position, and located in the space between a running web roll and replacement web roll carried on said support.

75. In a web supply mechanism, a rotatable web roll support having a plurality of holding means spaced around the axis of rotation of said support for carrying web rolls, means for rotating said support to bring said holding means successively to position for supporting a web roll for delivery of the web therefrom, control means mounted on said support for rotation therewith and comprising a peripheral web roll follower located in the space between said holding means and movable transversely of the axis of rotation of said support, associated with one of said holding means, biased toward the associated holding means, and adapted to engage the periphery of a web roll supported by said holding means.

76. In a web supply mechanism, a rotatable web roll support having a plurality of holding means spaced around the axis of rotation of said support for carrying web rolls, means for rotating said support to bring said holding means successively to position for supporting a web roll for delivery of the web therefrom, control means mounted on said support for rotation therewith and comprising a peripheral web roll follower arm pivoted in the space between said holding means and movable transversely of the axis of rotation of said support, associated with one of said holding means, biased toward the associated holding means, and adapted to engage the periphery of a web roll supported by said holding means.

77. In a web supply mechanism, a rotatable web roll support having a plurality of holding means spaced around the axis of rotation of said support for carrying web rolls, means for rotating said support in a predetermined direction to bring said holding means successively to position for supporting a web roll for delivery of the web therefrom by rotation in the opposite direction, control means mounted on said support for rotation therewith and comprising a peripheral web roll follower arm pivoted in the space between said holding means and movable transversely of the axis of rotation of said support, associated with one of said holding means, biased toward the associated holding means, and adapted to engage the periphery of a web roll supported by said holding means by extending from its pivot point tangentially of said web roll in the same direction as the direction of rotation of said roll while web is being delivered therefrom.

78. In a web supply mechanism, a rotatable web roll support having a plurality of holding means spaced around the axis of rotation of said support for carrying web rolls, means for rotating said support to bring said holding means successively to position for supporting a web roll for delivery of the web therefrom, control means mounted on said support for rotation therewith and comprising a peripheral web roll follower located in the space between said holding means and movable transversely of the axis of rotation of said support, associated with one of said holding means, biased toward the associated holding means, and adapted to engage the periphery of a web roll supported by said holding means, and a switch operably connected with said follower by a lost motion connection.

79. In a web supply mechanism, a rotatable web roll support provided with rotating mechanism and adapted to carry a plurality of web rolls, means mounted on said support adapted to control said rotating mechanism, said means comprising a plurality of pivoted arms situated between said web rolls and carried by said support whereby the position of said arms relative to said rolls is normally unaffected by rotation of said support, one of said pivoted arms being adapted to engage the periphery of each of said web rolls and extending tangentially of a web roll so engaged in the direction of rotation of said web roll while a web is being delivered therefrom, means for rotating said web roll support in the opposite direction for bringing rolls from loading to running position, and means operable by the pivoted arm engaging a running roll and responsive to a reduction in diameter of said roll for energizing said rotating mechanism to bring a running roll to position for joining its web to the web of a replacement roll and to bring a replacement roll into position adjacent said running web.

80. In a web supply mechanism, a rotatable web roll support provided with rotating mechanism and adapted to carry a plurality of web rolls, means mounted on said support adapted to control said rotating mechanism, said means comprising a plurality of pivoted arms situated between said web rolls and carried by said support whereby the position of said arms relative to said rolls is normally unaffected by rotation of said support, one of said pivoted arms being adapted to engage the periphery of each of said web rolls and extending tangentially of a web roll so engaged in the direction of rotation of said web roll while a web is being delivered therefrom, means for rotating said web roll support in the opposite direction for bringing rolls from loading to running position, and means operable by the pivoted arm engaging a running roll and responsive to a reduction in diameter of said roll for energizing said rotating mechanism to bring a running roll to position for joining its web to the web of a replacement roll and to bring a replacement roll into position adjacent said running web, said last named means comprising a switch and a lost motion connection between said switch and the said pivoted arms.

81. In a web supply mechanism, a rotatable web roll support provided with rotating mechanism and adapted to carry a plurality of web rolls, means mounted on said support adapted to control said rotating mechanism, said means comprising a plurality of pivoted arms situated between said web rolls and carried by said support whereby the position of said arms relative to said rolls is normally unaffected by rotation of said support, one of said pivoted arms being adapted to engage the periphery of each of said web rolls and extending tangentially of a web roll so engaged in the direction of rotation of said web roll while a web is being delivered therefrom, means for rotating said web roll support in the opposite direction for bringing rolls from loading to running position, means operable by the pivoted arm engaging a running roll and responsive to a reduction in diameter of said roll for energizing said rotating mechanism to bring a running roll to position for joining its web to the web of a replacement roll and to bring a replacement roll into position adjacent said running web, means for rotating said web roll support in the direction of rotation of said web roll while a web is being delivered therefrom and means for rotating said pivoted arm away from said web roll during said last named rotation of said web roll support and operable upon the commencement of such rotation of said web roll support.

82. In a web supply mechanism a rotatable web roll support adapted to carry a plurality of web rolls, means for bringing a replacement web roll to substantially the speed of a running web, means for pressing a running web against the replacement web roll for making a web join, mechanism for rotating said web roll support relatively to said two last named means, control means mounted on said web roll support and situated in the space between said web rolls carried thereby, said control means comprising a plurality of peripheral followers, one of said followers being associated with each of said web rolls, said followers, means for bringing a replacement roll up to web speed and means for pressing a running web against a replacement web roll for joining, being respectively so situated relative to said web roll support as to engage web rolls carried thereby at angularly distinct positions upon said web rolls relative to said web roll support.

83. A device of the class described comprising a roll stand for a printing press, having a central shaft, electrical means for causing rotation of said shaft and a plurality of pairs of paper holding arms carried by said shaft, each of said pairs of holding arms comprising holding means for axially supporting a paper roll, in combination with control means in the electrical circuit of said electrical means for each pair of holding arms carried by said shaft and means operated by said control means to close the electrical circuit when a paper roll in position at a feeding station reaches a predetermined size said control means comprising a follower adapted to engage the periphery of a paper roll held by the holding means of the corresponding pair of holding arms, biased toward said holding means and located between said holding means and the holding means associated with another pair of holding arms, whereby said follower is positioned in the path of a paper roll when the same is being set in place between a pair of holding arms and adapted to render said control means inoperative upon a paper roll being so set in place.

84. In a web supply mechanism, a rotatable web roll supporting member, means to rotate said member, and means prepositioned in accordance with the diameter of a replacement roll supported on said rotatable member to limit the amount of rotation thereof.

85. In a web supply mechanism, a web roll supporting member, web joining mechanism adapted to press a running web into engagement with a replacement roll supported on said member, means to move said member to position the replacement roll adjacent to, but spaced from, the running web, and means prepositioned in accordance with the diameter of the replacement roll to limit the movement of said member, to insure a predetermined spaced position of the roll with respect to the running web.

86. In combination, a web roll supporting reel, an electrical motor to rotate said reel to dispose a supported roll in a predetermined position, an electrical limit switch controlling said motor, and a switch actuating member rotatable with said reel, said switch actuating member being prepositioned in accordance with the diameter of a replacement roll supported on said reel, to actuate the switch and stop the motor when the predetermined position of the roll is reached.

87. In a web supply mechanism, a rotatable web roll supporting member, means to rotate said member, and means connected to and rotatable with said member and being prepositioned in accordance with the diameter of a replacement roll supported on said rotatable member to limit the amount of rotation thereof.

88. In a web supply mechanism, a rotatable web roll supporting member, means to rotate said member, a member positioned by a replacement roll in relation to the supporting member and in accordance with the diameter of the replacement roll, and means actuated by said positioned member during the rotation of the supporting member, to limit the amount of rotation of the supporting member.

89. In a web renewing mechanism, a movable support for carrying a replacement roll and a running roll, and means for performing web renewing operations, in combination with a follower moved to different positions under control of changes in the diameter of one of the rolls and controlling in its different positions different web renewing operations.

90. In a web supply mechanism, a rotatable web roll support, means to rotate the support, means to control said support rotating means, said support being adapted to rotatably support a web roll to permit its web to run therefrom, a movable member mounted on said support and adapted to bear upon the periphery of the web roll on said support and be movably responsive to the diameter thereof, means actuated by said member when the roll is of comparatively large diameter to cause said control means to stop said rotating means, and means actuated by said member when the roll is reduced in diameter by the running of its web therefrom to cause said control means to start said rotating means.

91. In a web supply mechanism, a rotatable support adapted to rotatably support a web roll to permit a web to run therefrom, means to rotate said support, and means mounted on said support and positionable in accordance with the diameter of the roll to limit the rotation of the support.

92. In a web supply mechanism, a rotatable support adapted to rotatably support a web roll to permit a web to run therefrom, means to rotate said support, a member movable in response to differences in the diameter of the web roll, means actuated by said member to limit the rotation of the support, and means actuated by the member to start rotation of the support.

93. In a web supply mechanism, a rotatable web roll support adapted to carry a running web roll and a replacement roll and being axially movable to carry rolls of varying lengths, means to rotate said support, a control for said support rotating means mounted on a stationary part, and means on said support bearing on the periphery of one roll, adapted to actuate said control in any axial position of said support and operably positioned by the placing of a replacement roll on said support.

94. In a web supply mechanism, a rotatable support for a plurality of web rolls, controls for said mechanism, and a follower adapted to be engaged by, and to bear upon, the periphery of a roll upon the roll being mounted on said support and be positioned to actuate one of said controls upon rotation of said support, and adapted to be positioned to actuate another of said controls by a reduction in the diameter of the roll, when a determined amount of its web has been removed therefrom.

95. In a web supply mechanism, the combination with a rotatable web roll support, of control means mounted thereon including a follower adapted to start the rotation of the support when a running roll has reached a predetermined size, and a second follower also mounted on the support and contacting with the periphery of the replacement roll and adapted to stop the support when a replacement roll has been moved to running position.

JOHN R. TOMLIN.
ARVID LUNDQUIST.
ALBERT J. HORTON.